(12) United States Patent
Stoppi et al.

(10) Patent No.: US 12,172,310 B2
(45) Date of Patent: Dec. 24, 2024

(54) SYSTEMS AND METHODS FOR PICKING OBJECTS USING 3-D GEOMETRY AND SEGMENTATION

(71) Applicant: INTRINSIC INNOVATION LLC, Mountain View, CA (US)

(72) Inventors: Guy Michael Stoppi, Victoria (CA); Agastya Kalra, Nepean (CA); Kartik Venkataraman, San Jose, CA (US); Achuta Kadambi, Los Altos Hills, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 597 days.

(21) Appl. No.: 17/362,762

(22) Filed: Jun. 29, 2021

(65) Prior Publication Data

US 2022/0410381 A1 Dec. 29, 2022

(51) Int. Cl.
*B25J 9/16* (2006.01)
*B25J 19/02* (2006.01)
(Continued)

(52) U.S. Cl.
CPC ............ *B25J 9/1612* (2013.01); *B25J 9/161* (2013.01); *B25J 19/023* (2013.01); *G06N 3/08* (2013.01);
(Continued)

(58) Field of Classification Search
CPC ........ B25J 9/1612; B25J 9/161; B25J 19/023; B25J 9/1697; G06N 3/08; G06T 7/10;
(Continued)

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

CN 2488005 Y 4/2002
CN 1619358 A 5/2005
(Continued)

OTHER PUBLICATIONS

US 8,957,977 B2, 02/2015, Venkataraman et al. (withdrawn)
(Continued)

*Primary Examiner* — Adam R Mott
*Assistant Examiner* — Sagar Kc
(74) *Attorney, Agent, or Firm* — Fish & Richardson P.C.

(57) ABSTRACT

A method for controlling a robotic system includes: capturing, by an imaging system, one or more images of a scene; computing, by a processing circuit including a processor and memory, one or more instance segmentation masks based on the one or more images, the one or more instance segmentation masks detecting one or more objects in the scene; computing, by the processing circuit, one or more pickability scores for the one or more objects; selecting, by the processing circuit, an object among the one or more objects based on the one or more pickability scores; computing, by the processing circuit, an object picking plan for the selected object; and outputting, by the processing circuit, the object picking plan to a controller configured to control an end effector of a robotic arm to pick the selected object.

30 Claims, 13 Drawing Sheets

(51) Int. Cl.
    *G06N 3/08* (2023.01)
    *G06T 7/10* (2017.01)
    *G06T 7/50* (2017.01)
    *G06T 7/73* (2017.01)

(52) U.S. Cl.
    CPC .................. *G06T 7/10* (2017.01); *G06T 7/50*
        (2017.01); *G06T 7/75* (2017.01); *G06T*
        *2207/10028* (2013.01); *G06T 2207/20081*
        (2013.01); *G06T 2207/20084* (2013.01)

(58) Field of Classification Search
    CPC ... G06T 7/50; G06T 7/75; G06T 2207/10028;
        G06T 2207/20081; G06T 2207/20084;
        G05B 2219/40053
    See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |

(56) References Cited

U.S. PATENT DOCUMENTS

| | | |
|---|---|---|
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,983,487 B2 | 7/2011 | Agrawal et al. |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |

(56) References Cited

U.S. PATENT DOCUMENTS

| | | |
|---|---|---|
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,643,383 B2 | 5/2020 | Venkataraman |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,984,276 B2 | 4/2021 | Venkataraman et al. |
| 11,022,725 B2 | 6/2021 | Duparre et al. |
| 11,024,046 B2 | 6/2021 | Venkataraman |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |

(56) References Cited

U.S. PATENT DOCUMENTS

| | | |
|---|---|---|
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |

(56) References Cited

U.S. PATENT DOCUMENTS

| | | |
|---|---|---|
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |

(56) References Cited

U.S. PATENT DOCUMENTS

| | | |
|---|---|---|
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | Van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |

(56) References Cited

U.S. PATENT DOCUMENTS

| | | |
|---|---|---|
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0268602 A1* | 10/2012 | Hirai ............ G06T 7/136 348/148 |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-Ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |

(56) References Cited

U.S. PATENT DOCUMENTS

| | | |
|---|---|---|
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0127161 A1* | 5/2015 | Satou .................... B25J 9/1697 700/259 |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0142405 A1 | 5/2017 | Shors et al. |
| 2017/0163862 A1 | 6/2017 | Molina |
| 2017/0178363 A1 | 6/2017 | Venkataraman et al. |

(56) References Cited

U.S. PATENT DOCUMENTS

| | | |
|---|---|---|
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0109782 A1 | 4/2018 | Duparre et al. |
| 2018/0124311 A1 | 5/2018 | Lelescu et al. |
| 2018/0131852 A1 | 5/2018 | McMahon |
| 2018/0139382 A1 | 5/2018 | Venkataraman et al. |
| 2018/0189767 A1 | 7/2018 | Bigioi |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0286120 A1 | 10/2018 | Fleishman et al. |
| 2018/0302554 A1 | 10/2018 | Lelescu et al. |
| 2018/0330182 A1 | 11/2018 | Venkataraman et al. |
| 2018/0376122 A1 | 12/2018 | Park et al. |
| 2019/0012768 A1 | 1/2019 | Tafazoli Bilandi et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0057513 A1 | 2/2019 | Jain et al. |
| 2019/0063905 A1 | 2/2019 | Venkataraman et al. |
| 2019/0089947 A1 | 3/2019 | Venkataraman et al. |
| 2019/0091869 A1* | 3/2019 | Yamazaki ............... B25J 15/08 |
| 2019/0098209 A1 | 3/2019 | Venkataraman et al. |
| 2019/0109998 A1 | 4/2019 | Venkataraman et al. |
| 2019/0164341 A1 | 5/2019 | Venkataraman |
| 2019/0174040 A1 | 6/2019 | Mcmahon |
| 2019/0197735 A1 | 6/2019 | Xiong et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0243086 A1 | 8/2019 | Rodda et al. |
| 2019/0244379 A1 | 8/2019 | Venkataraman |
| 2019/0261566 A1* | 8/2019 | Robertson ............... G06T 7/70 |
| 2019/0268586 A1 | 8/2019 | Mullis |
| 2019/0289176 A1 | 9/2019 | Duparre |
| 2019/0347768 A1 | 11/2019 | Lelescu et al. |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2020/0026948 A1 | 1/2020 | Venkataraman et al. |
| 2020/0151894 A1 | 5/2020 | Jain et al. |
| 2020/0252597 A1 | 8/2020 | Mullis |
| 2020/0262064 A1 | 8/2020 | Claussen et al. |
| 2020/0273138 A1* | 8/2020 | Chavez ............... G06T 7/10 |
| 2020/0316782 A1 | 10/2020 | Chavez et al. |
| 2020/0334905 A1 | 10/2020 | Venkataraman |
| 2020/0389604 A1 | 12/2020 | Venkataraman et al. |
| 2021/0023716 A1* | 1/2021 | Takaoka ............... G06T 7/521 |
| 2021/0023720 A1* | 1/2021 | Du ............... B25J 9/1669 |
| 2021/0042952 A1 | 2/2021 | Jain et al. |
| 2021/0044790 A1 | 2/2021 | Venkataraman et al. |
| 2021/0063141 A1 | 3/2021 | Venkataraman et al. |
| 2021/0133927 A1 | 5/2021 | Lelescu et al. |
| 2021/0138655 A1* | 5/2021 | Mousavian ............... B25J 9/161 |
| 2021/0150748 A1 | 5/2021 | Ciurea et al. |
| 2021/0187741 A1* | 6/2021 | Marthi ............... B25J 9/1676 |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |
| CN | 107346061 B | 4/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |

(56) References Cited

FOREIGN PATENT DOCUMENTS

| | | |
|---|---|---|
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 10200500042 39 A | 1/2005 |
| KR | 100496875 B1 | 6/2005 |
| KR | 10201100976 47 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |

(56) References Cited

FOREIGN PATENT DOCUMENTS

| | | | |
|---|---|---|---|
| WO | 2013043751 | A1 | 3/2013 |
| WO | 2013043761 | A1 | 3/2013 |
| WO | 2013049699 | A1 | 4/2013 |
| WO | 2013055960 | A1 | 4/2013 |
| WO | 2013119706 | A1 | 8/2013 |
| WO | 2013126578 | A1 | 8/2013 |
| WO | 2013166215 | A1 | 11/2013 |
| WO | 2014004134 | A1 | 1/2014 |
| WO | 2014005123 | A1 | 1/2014 |
| WO | 2014031795 | A1 | 2/2014 |
| WO | 2014052974 | A2 | 4/2014 |
| WO | 2014032020 | A3 | 5/2014 |
| WO | 2014078443 | A1 | 5/2014 |
| WO | 2014130849 | A1 | 8/2014 |
| WO | 2014131038 | A1 | 8/2014 |
| WO | 2014133974 | A1 | 9/2014 |
| WO | 2014138695 | A1 | 9/2014 |
| WO | 2014138697 | A1 | 9/2014 |
| WO | 2014144157 | A1 | 9/2014 |
| WO | 2014145856 | A1 | 9/2014 |
| WO | 2014149403 | A1 | 9/2014 |
| WO | 2014149902 | A1 | 9/2014 |
| WO | 2014150856 | A1 | 9/2014 |
| WO | 2014153098 | A1 | 9/2014 |
| WO | 2014159721 | A1 | 10/2014 |
| WO | 2014159779 | A1 | 10/2014 |
| WO | 2014160142 | A1 | 10/2014 |
| WO | 2014164550 | A2 | 10/2014 |
| WO | 2014164909 | A1 | 10/2014 |
| WO | 2014165244 | A1 | 10/2014 |
| WO | 2014133974 | A9 | 4/2015 |
| WO | 2015048694 | A2 | 4/2015 |
| WO | 2015048906 | A1 | 4/2015 |
| WO | 2015070105 | A1 | 5/2015 |
| WO | 2015074078 | A1 | 5/2015 |
| WO | 2015081279 | A1 | 6/2015 |
| WO | 2015134996 | A1 | 9/2015 |
| WO | 2015183824 | A1 | 12/2015 |
| WO | 2016054089 | A1 | 4/2016 |
| WO | 2016/172125 | | 10/2016 |
| WO | 2016167814 | A1 | 10/2016 |
| WO | 2016172125 | A9 | 4/2017 |
| WO | 2018053181 | A1 | 3/2018 |
| WO | 2019038193 | A1 | 2/2019 |
| WO | 2019055848 | | 3/2019 |

OTHER PUBLICATIONS

Aldoma, Aitor, et al. "OUR-CVFH-Oriented, Unique and Repeatable Clustered Viewpoint Feature Histogram for Object Recognition and 6DOF Pose Estimation." Joint DAGM (German Association for Pattern Recognition) and OAGM Symposium. Springer, Berlin, Heidelberg, 2012, pp. 113-122.
An, Gwon Hwan, et al. "Charuco Board-Based Omnidirectional Camera Calibration Method." *Electronics* 7.12 (2018): 421, 15 pages.
Arnab et al. "Pixelwise instance segmentation with a dynamically instantiated network," In: Proceedings of the IEEE Conference on Computer Vision and Pattern Recognition, Apr. 7, 2017, Retrieved on Oct. 26, 2020 from https://openaccess.thecvf.com/content_cvpr_2017/papers/Arnab_Pixelwise_Instance_Seg_mentation_CFPR_2017_paper.pdf, 11 pages.
Atkinson, Gary A. et al. "Recovery of Surface Orientation From Diffuse Polarization" IEEE Transactions On Image Processing, vol. 15, No. 6, Jun. 2006, pp. 1653-1664.
Bai et al. "Deep watershed transform for instance segmentation," In: Proceedings of the IEEE Conference on Computer Vision and Pattern Recognition, Nov. 24, 2016, Retrieved on Oct. 26, 2020 from https://openaccess.thecvf.com/content_cvpr_2017/papers/Bai_Deep_Watershed_Transform_CVPR_2017_paper.pdf, 10 pages.
Domae, Yukiyasu, et al. "Fast Graspability Evaluation on Single Depth Maps for Bin Picking with General Grippers." 2014 IEEE International Conference on Robotics and Automation (ICRA). IEEE, 2014, 10 pages.
Garrido-Jurado, Sergio, et al. "Automatic generation and detection of highly reliable fiducial markers under occlusion." *Pattern Recognition* 47.6 (2014): 390-402.
Gualtieri, Marcus, et al. "Robotic Pick-and-Place With Uncertain Object Instance Segmentation and Shape Completion." IEEE Robotics and Automation Letters 6.2 (2021): 1753-1760.
Guo, Jiaxin, et al. "Fast and Robust Bin-picking System for Densely Piled Industrial Objects." arXiv preprint arXiv:2012.00316 (2020), 6 pages.
He, Kaiming, et al. "Mask R-CNN." *Proceedings of the IEEE International Conference on Computer Vision*. 2017, pp. 2961-2969.
He, Kaiming et al., Deep Residual Learning for Image Recognition. In Proceedings of the IEEE Conference on Computer Vision and Pattern Recognition, pp. 770-778, 2016.
Howard, Andrew G., et al. "Mobilenets: Efficient convolutional neural networks for mobile vision applications." arXiv preprint arXiv:1704.04861 (2017).
Howard, Andrew, et al. "Searching for MobileNetV3." Proceedings of the IEEE International Conference on Computer Vision. 2019.
Kirillov et al., "Instancecut: from edges to instances with multicut," In: Proceedings of the IEEE Conference on Computer Vision and Pattern Recognition, Nov. 24, 2016, Retrieved on Oct. 26, 2020 from https://openaccess.thecvf.com/content_cypr_2017/papers/Kirilloy_InstanceCut_From_Edges_CVPR_2017_paper.pdf, 11 pages.
Krizhevsky, Alex, Ilya Sutskever, and Geoffrey E. Hinton. "ImageNet classification with deep convolutional neural networks." Advances in neural information processing systems. 2012.
Lin, Tsung-Yi, et al. "Feature Pyramid Networks for Object Detection." *Proceedings of the IEEE conference on computer vision and pattern recognition*. 2017, pp. 2117-2125.
Lin, Tsung-Yi et al. "Microsoft COCO: Common Objects in Context." In European Conference on Computer Vision, pp. 740-755. Springer, 2014.
Mahler, J. et al. "Dex-Net 3.0: Computing Robust Vacuum Suction Grasp Targets in Point Clouds Using a New Analytic Model and Deep Learning," in Proc. Int. Conf. Robot. Automation, 2018, pp. 1-8.
Mahler, J. et al. "Learning Ambidextrous Robot Grasping Policies," Sci. Robot., vol. 4, No. 26, eaau4984, 2019, 12 pages.
Manuelli, Lucas, et al. "kPAM: KeyPoint Affordances for Category-Level Robotic Manipulation." arXiv preprint arXiv: 1903.06684 (2019), 26 pages.
Martinez, Carlos et al. "Automated 3D Vision Guided Bin Picking Process for Randomly Located Industrial Parts." 2015 IEEE International Conference on Industrial Technology (ICIT). IEEE, 2015, pp. 3172-3177.
Nishina Yuki, et al. "Model-less Grasping Points Estimation for Bin-Picking of Non-Rigid Objects and Irregular-Shaped Objects." Omron Technics. Vol. 52.012EN (2020), 8 pages.
Park, Kiru, et al. "Multi-Task Template Matching for Object Detection, Segmentation and Pose Estimation Using Depth Images." 2019 International Conference on Robotics and Automation (ICRA). IEEE, 2019, 7 pages.
Pinheiro, Pedro O., et al. "Learning to Segment Object Candidates." ArXiv:1506.06204 [Cs], Sep. 2015. arXiv.org, http://arxiv.org/abs/1506.06204.
Redmon, J. et al. "Real-Time Grasp Detection Using Convolutional Neural Networks," in Proc. Int. Conf. Robot. Automation, 2015, pp. 1316-1322.
Ren et al. End-to-end instance segmentation with recurrent attention. In *Proceedings of the IEEE Conference on Computer Vision and Pattern Recognition*, pp. 6656-6664, 2017.
Ren, Shaoqing et al. "Faster r-cnn: Towards real-time object detection with region proposal networks." In *Advances in Neural Information Processing Systems*, pp. 91-99, 2015.
Romera-Paredes et al. Recurrent instance segmentation. In *European Conference on Computer Vision*, pp. 312-329. Springer, 2016.

(56) References Cited

OTHER PUBLICATIONS

Ronneberger, Olaf, et al. "U-Net: Convolutional Networks for Biomedical Image Segmentation." *International Conference on Medical Image Computing and Computer-Assisted Intervention.* Springer, Cham, 2015, pp. 1-8.
Sandler, Mark, et al. "MobileNetV2: Inverted residuals and linear bottlenecks." Proceedings of the IEEE Conference on Computer Vision and Pattern Recognition. 2018.
Schwarz, Max, et al. "RGB-D Object Detection and Semantic Segmentation for Autonomous Manipulation in Clutter." The International Journal of Robotics Research 37.4-5 (2018): 437-451.
Simonyan, Karen, and Andrew Zisserman. "Very deep convolutional networks for large-scale image recognition." arXiv preprint arXiv: 1409.1556 (2014).
Torii, Takuya et al. "Model-less Estimation Method for Robot Grasping Parameters Using 3D Shape Primitive Approximation." 2018 IEEE 14th International Conference on Automation Science and Engineering (CASE). IEEE, 2018, pp. 580-585.
Wada, Kentaro, et al. "Instance Segmentation of Visible and Occluded Regions for Finding and Picking Target from a Pile of Objects." 2018 IEEE/RSJ International Conference on Intelligent Robots and Systems (IROS). IEEE, 2018, 4 pages.
Wada, Kentaro, et al. "Joint Learning of Instance and Semantic Segmentation for Robotic Pick-and-Place with Heavy Occlusions in Clutter." 2019 International Conference on Robotics and Automation (ICRA). IEEE, 2019, 7 pages.
Xie, Christopher, et al. "The Best of Both Modes: Separately Leveraging RGB and Depth for Unseen Object Instance Segmentation." Conference on Robot Learning. PMLR, 2020, 10 pages.
Zhuang, Chungang, et al. "Semantic part segmentation method based 3D object pose estimation with RGB-D images for bin-picking." Robotics and Computer-Integrated Manufacturing 68 (2021): 102086, 13 pages.
International Search Report and Written Opinion in International Appln. No. PCT/US2022/035490, dated Oct. 13, 2022, 21 pages.
PCT Appln. No. PCT/US2020/048604, Kalra et al., Systems and methods for transparent object segmentation using polarization cues, filed Nov. 30, 2019, 60 pages.
PCT Appln. No. PCT/US2021/015926, Kalra et al., Systems and methods for pose detection and measurement, filed Jan. 29, 2020, 97 pages.
Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, Or, USA, pp. 17-24.
Bennett et al., "Multispectral Bilateral Video Fusion", Computer Graphics (ACM SIGGRAPH Proceedings), Jul. 25, 2006, published Jul. 30, 2006, 1 pg.
Bennett et al., "Multispectral Video Fusion", Computer Graphics (ACM SIGGRAPH Proceedings), Jul. 25, 2006, published Jul. 30, 2006, 1 pg.
Berretti et al., "Face Recognition by Super-Resolved 3D Models from Consumer Depth Cameras", IEEE Transactions on Information Forensics and Security, vol. 9, No. 9, Sep. 2014, pp. 1436-1448.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date April 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for The Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al, "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, Pp. 72460X-1-72460X-9; doi: 10.1117/12.810369.
Bruckner et al., "Thin wafer-level camera lenses inspired by insect compound eyes", Optics Express, Nov. 22, 2010, vol. 18, No. 24, pP. 24379-24394.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone. 0045301, 9 pgs.
Bulat et al., "How far are we from solving the 2D & 3D Face Alignment problem? (and a dataset of 230,000 3D facial landmarks)", arxiv.org, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-resolution", Retrieved on Nov. 10, 2012, Retrieved from the Internet at URL :<http://citeseerx.ist. psu.edu/viewdoc/download?doi=1 0.1.1.226.2643&rep=rep1 &type= pdf>, 2001, 269 pgs.
Caron et al., "Multiple camera types simultaneous stereo calibration, Robotics and Automation (ICRA)", 2011 IEEE International Conference On, May 1, 2011 (May 1, 2011), pp. 2933-2938.
Carroll et al., "Image Warps for Artistic Perspective Manipulation", ACM Transactions on Graphics (TOG), vol. 29, No. 4, Jul. 26, 2010, Article No. 127, 9 pgs.

(56) References Cited

OTHER PUBLICATIONS

Chan et al., "Investigation of Computational Compound-Eye Imaging System with Super-Resolution Reconstruction", IEEE, ISASSP, Jun. 19, 2006, pp. 1177-1180.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging system", Multidim. Syst. Sign. Process, published online Feb. 23, 2007, vol. 18, pp. 83-101.
Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors" CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation For 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Dou et al., "End-to-end 3D face reconstruction with deep neural networks" arXiv:1704.05020v1, Apr. 17, 2017, 10 pgs.
Drouin et al., "Improving Border Localization of Multi-Baseline Stereo Using Border-Cut", International Journal of Computer Vision, Jul. 5, 2006, vol. 83, Issue 3, 8 pgs.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Microoptical artificial compound eyes - from design to experimental verification of two different concepts", Proc. of SPIE, Optical Design and Engineering II, vol. 5962, Oct. 17, 2005, pp. 59622A-1-59622A-12.
Duparre et al., Novel Optics/Micro-Optics for Miniature Imaging Systems, Proc. of SPIE, Apr. 21, 2006, vol. 6196, pp. 619607-1-619607-15.
Duparre et al., "Micro-optical artificial compound eyes", Bioinspiration & Biomimetics, Apr. 6, 2006, vol. 1, pp. R1-R16.
Duparre et al., "Artificial compound eye zoom camera", Bioinspiration & Biomimetics, Nov. 21, 2008, vol. 3, pp. 1-6.
Duparre et al., "Artificial apposition compound eye fabricated by micro-optics technology", Applied Optics, Aug. 1, 2004, vol. 43, No. 22, pp. 4303-4310.
Duparre et al., "Micro-optically fabricated artificial apposition compound eye", Electronic Imaging—Science and Technology, Prod. SPIE 5301, Jan. 2004, pp. 25-33.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Ultra-Thin Camera Based on Artificial Apposition Compound Eyes", 10th Microoptics Conference, Sep. 1-3, 2004, 2 pgs.
Duparre et al., "Microoptical telescope compound eye", Optics Express, Feb. 7, 2005, vol. 13, No. 3, pp. 889-903.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Microoptical Artificial Compound Eyes—Two Different Concepts for Compact Imaging Systems", 11th Microoptics Conference, Oct. 30-Nov. 2, 2005, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL :<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fangmin et al., "3D Face Reconstruction Based on Convolutional Neural Network", 2017 10th International Conference on Intelligent Computation Technology and Automation, Oct. 9-10, 2017, Changsha, China.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fechteler et al., Fast and High Resolution 3D Face Scanning, IEEE International Conference on Image Processing, Sep. 16-Oct. 19, 2007, 4 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.

(56) References Cited

OTHER PUBLICATIONS

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 49-58.
Fischer et al., "Optical System Design", 2nd Edition, SPIE Press, Feb. 14, 2008, pp. 191-198.
Garg et al., "Unsupervised CNN for Single View Depth Estimation: Geometry to the Rescue", In European Conference on Computer Vision, Springer, Cham, Jul. 2016, 16 pgs.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgeiv et al., "Light-Field Capture by Multiplexing in the Frequency Domain", Adobe Systems Incorporated, Adobe Technical Report, 2003, 13 pgs.
Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. 1-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computer and Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger ER Al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", ICCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>, pp. 1-8.
Jourabloo, "Large-Pose Face Alignment via CNN-Based Dense 3D Model Fitting", ICCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.

(56) References Cited

OTHER PUBLICATIONS

Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.
Konolige, Kurt "Projected Texture Stereo", 2010 IEEE International Conference on Robotics and Automation, May 3-7, 2010, pp. 148-155.
Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI: 10.1109/ICRA.201135980382.
Lane et al., "A Survey of Mobile Phone Sensing", IEEE Communications Magazine, vol. 48, Issue 9, Sep. 2010, pp. 140-150.
Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.
Lee, "NFC Hacking: The Easy Way", Defcon Hacking Conference, 2012, 24 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lee et al., "Automatic Upright Adjustment of Photographs", IEEE Conference on Computer Vision and Pattern Recognition (CVPR), 2012, pp. 877-884.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images with Different Focuses Using Support Vector Machines", IEEE Transactions on Neural Networks, vol. 15, No. 6, Nov. 8, 2004, pp. 1555-1561.
Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Ma et al., "Constant Time Weighted Median Filtering for Stereo Matching and Beyond", ICCV '13 Proceedings of the 2013 IEEE International Conference on Computer Vision, IEEE Computer Society, Washington DC, USA, Dec. 1-8, 2013, 8 pgs.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Medioni et al., "Face Modeling and Recognition in 3-D", Proceedings of the IEEE International Workshop on Analysis and Modeling of Faces and Gestures, 2013, 2 pgs.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Milella et al., "3D reconstruction and classification of natural environments by an autonomous vehicle using multi-baseline stereo", Intelligent Service Robotics, vol. 7, No. 2, Mar. 2, 2014, pp. 79-92.
Min et al., "Real-Time 3D Face Identification from a Depth Camera", Proceedings of the IEEE International Conference on Pattern Recognition, Nov. 11-15, 2012, 4 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Ng et al., "Light Field Photography with a Hand-held Plenoptic Camera", Stanford Tech Report CTSR Feb. 2005, Apr. 20, 2005, pp. 1-11.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nguyen et al., "Error Analysis for Image-Based Rendering with Depth Information", IEEE Transactions on Image Processing, vol. 18, Issue 4, Apr. 2009, pp. 703-716.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.

(56) References Cited

OTHER PUBLICATIONS

Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 · Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12th International Conference on Computer Vision Workshops, ICCV Workshop: Kyoto, Japan, Sep. 27- Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses". Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Thin observation module by bound optics (TOMBO): concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.

(56) References Cited

OTHER PUBLICATIONS

Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Mola et al., "Robust Real-time Object Detection", Cambridge Research Laboratory, Technical Report Series, Compaq, CRL Jan. 2001, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality matting", ACM Transactions on Graphics (TOG)—Proceedings of ACM.
SIGGRAPH 2007, vol. 26, Issue 3, Article 9, Jul. 2007, 6 pg., published Aug. 5, 2007.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Facial Feature Point Detection: A Comprehensive Survey", arXiv: 1410.1037v1, Oct. 4, 2014, 32 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Widanagamaachchi et al., "3D Face Recognition from 2D Images: A Survey", Proceedings of the International Conference on Digital Image Computing: Techniques and Applications, Dec. 1-3, 2008, 7 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "Superresolution Using Preconditioned Conjugate Gradient Method", Proceedings of SPIE—The International Society for Optical Engineering, Jul. 2002, 8 pgs.
Yang et al., "A Real-Time Distributed Light Field Camera", Eurographics Workshop on Rendering (2002), published Jul. 26, 2002, pp. 1-10.
Yang et al., Model-based Head Pose Tracking with Stereovision, Microsoft Research, Technical Report, MSR-TR-2001-102, Oct. 2001, 12 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zbontar et al., Computing the Stereo Matching Cost with a Convolutional Neural Network, CVPR, 2015, pp. 1592-1599.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.
Zhang et al., "Spacetime Faces: High Resolution Capture for Modeling and Animation", ACM Transactions on Graphics, 2004, 11pgs.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
"Exchangeable image file format for digital still cameras: Exif Version 2.2"_, Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.

\* cited by examiner

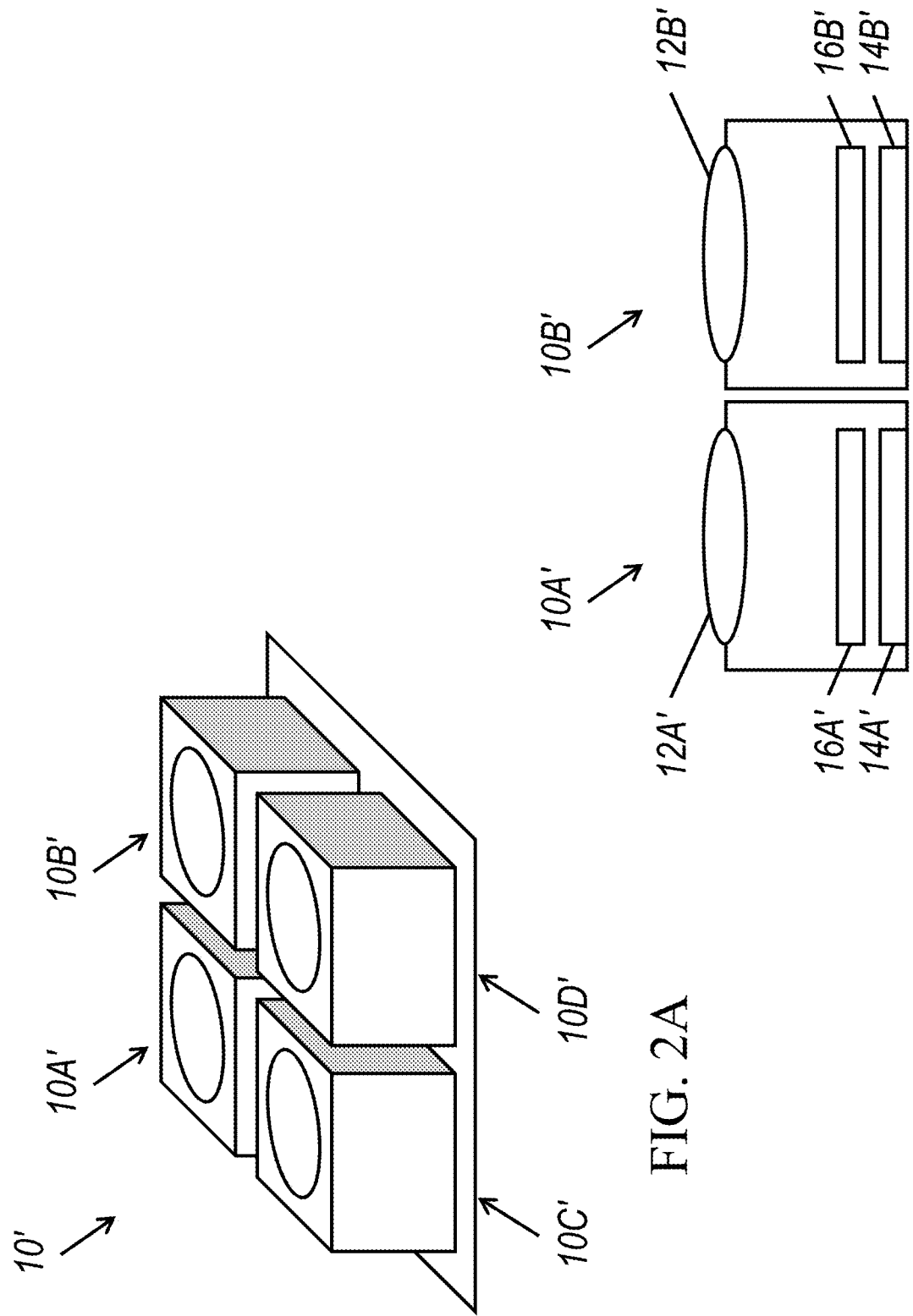

SYSTEMS AND METHODS FOR PICKING OBJECTS USING 3-D GEOMETRY AND SEGMENTATION

FIELD

Aspects of embodiments of the present disclosure relate to computer vision, including systems and methods for picking objects using 3-D geometry and segmentation.

BACKGROUND

Robotic automation is an area of growing interest in increasing the efficiency of manufacturing and logistics operations through the picking and placing of objects in industrial settings as well as in home use, such as assisting infirm people in household activities.

Automating the process of picking disorganized objects from a bin is a very complex problem. While a human may be able to intuitively recognize which objects in a bin can be grasped and the best likely points at which to grip an object that the human wishes to take from the bin, replicating a human skill at this task is difficult for a variety of issues. One such issue is that while a human is able to generalize to different objects and different environments, current robotic systems are generally unreliable outside of carefully controlled environments, such as where objects are presented to the robotic systems in regular and orderly arrangements, such as where the objects are arranged in a grid and where all of the objects in the grid have the same orientation. In particular, such robotic systems may not generalize well to unknown or unseen objects or conditions in which the positions and orientations of the objects is irregular, such as the case of objects jumbled in a bin.

Generalizing to different objects and different environments is especially hard for vision systems that are often used to guide the bin-picking process. These vision systems typically capture images of a scene using cameras and analyze the captured images to estimate the location and orientation of the objects to pick. This is a challenging task, especially in the case of unknown environments (including varying lighting conditions) and irregular conditions and orientations of objects in the bin.

SUMMARY

Some aspects of embodiments of the present disclosure relate to systems and methods for picking objects using 3-D geometry and segmentation as computed from one or more images depicting a scene containing objects to be picked.

According to one embodiment of the present disclosure, a method for controlling a robotic system includes: capturing, by an imaging system, one or more images of a scene; computing, by a processing circuit including a processor and memory, one or more instance segmentation masks based on the one or more images, the one or more instance segmentation masks detecting one or more objects in the scene; computing, by the processing circuit, one or more pickability scores for the one or more objects; selecting, by the processing circuit, an object among the one or more objects based on the one or more pickability scores; computing, by the processing circuit, an object picking plan for the selected object; and outputting, by the processing circuit, the object picking plan to a controller configured to control an end effector of a robotic arm to pick the selected object.

The method may further include: computing one or more depth maps based on the one or more images of the scene; and segmenting the one or more depth maps into one or more point clouds using the one or more instance segmentation masks, the one or more point clouds corresponding to the one or more objects in the scene.

The computing the one or more pickability scores for the one or more objects may include computing a pickability score for an object of the one or more objects by: computing a measure of clutter in a neighborhood of the object based on the one or more point clouds; computing a measure of distance of the object from a current location of the end effector of the robotic arm based on the one or more point clouds; and computing a measure of how much an object protrudes from other objects of the one or more objects based on the one or more point clouds.

The object picking plan may include a picking position and a direction of approach, and the computing the object picking plan for the selected object may include computing the picking position based on a visible center of mass of a point cloud corresponding to the selected object.

The computing the picking position may further include computing an estimated center of mass based on adjusting the visible center of mass by a scalar value to be farther from a viewpoint corresponding to a camera used to capture the one or more images of the scene.

The computing the one or more pickability scores for the one or more objects may include supplying the one or more depth maps and the one or more instance segmentation masks to an object pickability neural network.

The computing the one or more pickability scores for the one or more objects may include computing a pickability score for an object of the one or more objects by: computing a measure of clutter in a neighborhood of the object based on the one or more instance segmentation masks; computing a measure of distance of the object from a current location of the end effector of the robotic arm based on the one or more instance segmentation masks; and computing a measure of how much an object protrudes from other objects of the one or more objects based on the one or more instance segmentation masks.

The computing the one or more pickability scores for the one or more objects may include supplying the one or more instance segmentation masks to an object pickability neural network.

The object picking plan may include a picking position and a direction of approach.

The one or more images may include images captured based on a plurality of different imaging modalities.

The one or more images may include polarization raw frames.

The one or more instance segmentation masks may be computed using a trained convolutional neural network.

The one or more images may include images captured from a plurality of different viewpoints, and the one or more instance segmentation masks may include a plurality of instance segmentation masks corresponding to the different viewpoints.

The pickability scores may be computed independently for different instance segmentation masks corresponding to the different viewpoints, and the selecting the object may be based on the one or more pickability scores aggregated across the objects visible from the different viewpoints.

The method may further include computing depth maps for the different viewpoints, and the pickability scores may be further computed based on the depth maps.

According to one embodiment of the present disclosure, a system includes: a processor; and memory storing instructions that, when executed by the processor, cause the processor to: receive one or more images of a scene from an imaging system; compute one or more instance segmentation masks based on the one or more images, the one or more instance segmentation masks detecting one or more objects in the scene; compute one or more pickability scores for the one or more objects; select an object among the one or more objects based on the one or more pickability scores; compute an object picking plan for the selected object; and output the object picking plan to a controller configured to control an end effector of a robotic arm to pick the selected object.

The memory may further store instructions that, when executed by the processor, cause the processor to: compute one or more depth maps based on the one or more images of the scene; and segment the one or more depth maps into one or more point clouds using the one or more instance segmentation masks, the one or more point clouds corresponding to the one or more objects in the scene.

The instructions to compute the one or more pickability scores for the one or more objects may further include instructions that, when executed by the processor, cause the processor to compute a pickability score for an object of the one or more objects by: computing a measure of clutter in a neighborhood of the object based on the one or more point clouds; computing a measure of distance of the object from a current location of the end effector of the robotic arm based on the one or more point clouds; and computing a measure of how much an object protrudes from other objects of the one or more objects based on the one or more point clouds.

The object picking plan may include a picking position and a direction of approach, the instructions to compute the object picking plan for the selected object may further include instructions that, when executed by the processor, cause the processor to compute the picking position based on a visible center of mass of a point cloud corresponding to the selected object.

The instructions to compute the picking position may further include instructions that, when executed by the processor, cause the processor to compute an estimated center of mass based on adjusting the visible center of mass by a scalar value to be farther from a viewpoint corresponding to a camera used to capture the one or more images of the scene.

The instructions to compute the one or more pickability scores for the one or more objects may further include instructions that, when executed by the processor, cause the processor to supply the one or more depth maps and the one or more instance segmentation masks to an object pickability neural network.

The instructions to compute the one or more pickability scores for the one or more objects may include instructions that, when executed by the processor, cause the processor to compute a pickability score for an object of the one or more objects by: computing a measure of clutter in a neighborhood of the object based on the one or more instance segmentation masks; computing a measure of distance of the object from a current location of the end effector of the robotic arm based on the one or more instance segmentation masks; and computing a measure of how much an object protrudes from other objects of the one or more objects based on the one or more instance segmentation masks.

The instructions to compute the one or more pickability scores for the one or more objects may further include instructions that, when executed by the processor, cause the processor to supply the one or more instance segmentation masks to an object pickability neural network.

The object picking plan may include a picking position and a direction of approach.

The one or more images may include images captured based on a plurality of different imaging modalities.

The one or more images may include polarization raw frames.

The one or more instance segmentation masks may be computed using a trained convolutional neural network.

The one or more images may include images captured from a plurality of different viewpoints, and the one or more instance segmentation masks may include a plurality of instance segmentation masks corresponding to the different viewpoints.

The pickability scores may be computed independently for different instance segmentation masks corresponding to the different viewpoints, and the memory may further store instructions that, when executed by the processor, cause the processor to select the object based on the one or more pickability scores aggregated across the one or more objects visible from the different viewpoints.

The memory may further store instructions that, when executed by the processor, cause the processor to compute depth maps for the different viewpoints, and the pickability scores may be further computed based on the depth maps.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a perspective view of a camera array according to one embodiment of the present disclosure.

FIG. 2B is a cross sectional view of a portion of a camera array according to one embodiment of the present disclosure.

DETAILED DESCRIPTION

Figure 1A:
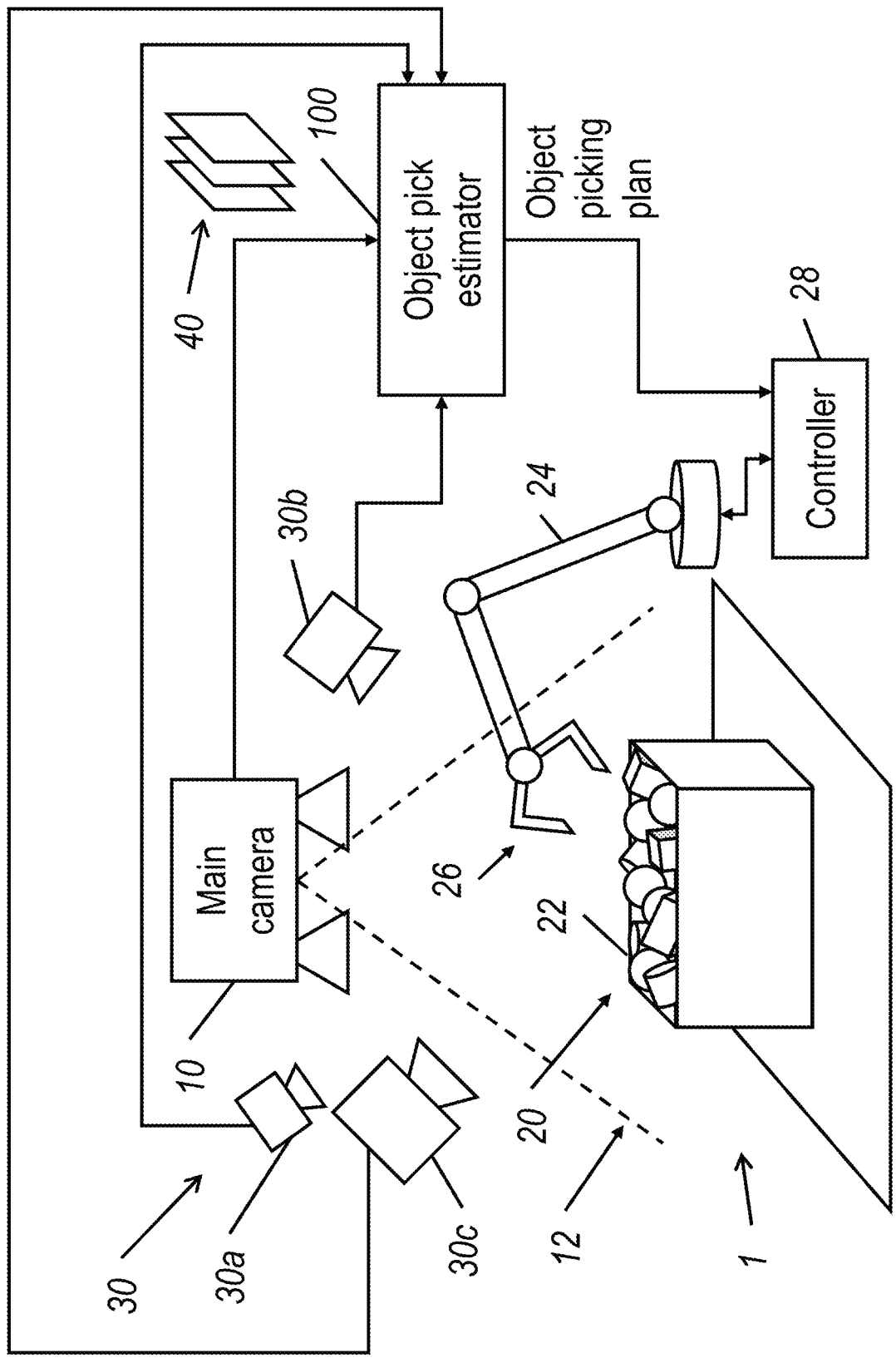
FIG. 1A is a schematic diagram depicting a object pick estimator according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present disclosure relate to systems and methods for picking objects using 3-D geometry and segmentation as computed from one or more images depicting a scene containing objects to be picked.

Generally, in vision-guided robotics, an imaging system is used to capture images of a scene, which may include objects to be picked up by a robotic system such as a robot arm with a gripping end effector (e.g., fingers that can pinch or grasp an object from two or more directions and/or a suction gripper that forms a suction grip on a compatible surface of the object). A computing system or vision system applies various computer vision algorithms to the captured images to compute semantic information about objects in the scene, and the robotic system uses the semantic information to generate a motion path for picking an object from the scene.

Some comparative methods for picking known objects involves computing the six degree of freedom (6-DoF) poses of those objects (e.g., three-dimensional translation coordinates and three-dimensional rotational coordinates). As used herein, the term "known objects" will refer to objects that are pre-registered with a vision system that is used to analyze a scene to identify objects. For example, some vision systems store 3-D models or CAD models (e.g., 3-D mesh models) of the different known objects that the vision system will encounter and align the 3-D models to the objects as depicted in the images.

However, computing 6-DoF poses can be slow and may not be applicable in cases where the vision system does not have a 3-D model representing the rigid object in order to align the 3-D model to the observed object. The long processing times that are associated with computing 6-DoF poses may make such techniques unsuitable in cases where the desired cycle times (e.g., amount of time spent picking each object) are short. Computing 6-DoF poses may also be difficult in cases where the objects are flexible or deformable (e.g., where the objects are not rigid) because the 3-D model may not accurately match the shape of the object.

Some comparative approaches attempt to detect grasping points on objects purely using depth maps (e.g., 2.5D maps generated by a depth camera such as an RGBD camera or a time of flight depth camera, see, e.g., Guo, Jiaxin, et al. "Fast and Robust Bin-picking System for Densely Piled Industrial Objects." arXiv preprint arXiv:2012.00316 (2020). and Nishina Yuki, et al. "Model-less Grasping Points Estimation for Bin-Picking of Non-Rigid Objects and Irregular-Shaped Objects." Omron Technics. Vol. 52.012EN (2020).), and some approaches attempt to fit geometric primitives (e.g., hexahedrons, spheres, or cylinders) to the detected shapes of objects to select grasping points based on the geometric primitives (see, e.g., Torii, Takuya, and Manabu Hashimoto. "Model-less estimation method for robot grasping parameters using 3D shape primitive approximation." 2018 IEEE 14th International Conference on Automation Science and Engineering (CASE). IEEE, 2018.).

Humans are able to intuitively pick objects from bins, even when cluttered and even when the objects may be new or novel (e.g., previously unseen objects).

Accordingly, some aspects of embodiments of the present disclosure relate to systems and methods for performing object picking analyses using instance segmentation to detect objects in a scene without performing an additional operation of estimating the 6-DoF pose of the object to be picked and/or without attempting to fit a 3-D model (e.g., a 3-D model of an idealized instance of the object or one or more geometric primitives) to the observed shape of the object (e.g., from a depth map). In addition, some aspects of embodiments of the present disclosure relate to further improving the pick using a depth map in conjunction with an instance segmentation mask computed by an instance segmentation module.

In general, an object pick estimation system according to embodiments of the present disclosure computes an object picking plan for a robotic arm to pick an object. The object pick estimation system may begin a process by using an imaging system to capture one or more images of a scene and then using the one or more images to compute an instance segmentation mask (or instance segmentation map) of the objects in the scene. The object pick estimation system may also estimate a depth map (e.g., based on capturing stereo images of a scene and computing depth from stereo). The instance segmentation mask identifies one or more instances of objects that appear in the images. The object pick estimation system computes pickability scores for the detected objects (using the instance segmentation mask and the depth map, if available) and an object is selected based on the pickability score. The system then computes a picking plan (e.g., coordinates of surfaces of the object that can be grasp and a direction along which to approach the object) for the robotic arm to pick the selected object. This picking plan may then be supplied to a robotic controller, which computes a motion plan to guide the robotic arm to this position and to pick up the object.

To provide some context, FIG. 1A is a schematic diagram depicting an object pick estimation system according to one embodiment of the present disclosure. As shown in FIG. 1A, a main camera 10 is arranged such that its field of view 12 captures images 40 of an arrangement 20 of objects 22 resting on a support platform in a scene 1. In the embodiment shown in FIG. 1A, the main camera 10 is located above the support platform (e.g., spaced apart from the objects 22 along the direction of gravity), but embodiments of the present disclosure are not limited thereto—for example, the main camera 10 can be arranged to have a downward angled view of the objects 22.

In some embodiments, one or more support cameras 30 are arranged at different poses or viewpoints around the scene containing the arrangement 20 of objects 22. Accordingly, each of the support cameras 30, e.g., first support camera 30a, second support camera 30b, and third support camera 30c, captures images 40 representing different views of the objects 22 from different viewpoints (e.g., a first viewpoint, a second viewpoint, and a third viewpoint, respectively) from one another and different viewpoints from the main camera 10. The viewpoints may be distinguished from one another in that they have substantially different optical axes, such as optical axes that are not parallel (non-parallel) to one another or that are spaced apart by a large distance if they are parallel to one another.

While FIG. 1A shows three support cameras 30, embodiments of the present disclosure are not limited thereto and may include, for example, at least one support camera 30 and may include more than three support cameras 30. In some embodiments, no support cameras are used and only a single main camera 10 is used from a single viewpoint.

In addition, while the main camera 10 is depicted in FIG. 1A as a stereo camera, embodiments of the present disclosure are not limited thereto, and may be used with, for example, a monocular main camera. As used herein, a stereo camera will be referred to as capturing images from a single viewpoint, as the camera modules of a stereo camera generally have optical axes that are substantially parallel to one another (and may be rectified to synthetically produce such parallel optical axes) and are generally spaced apart along a relatively short baseline to generate a depth map using stereo from a single viewpoint.

An object pick estimator 100 according to various embodiments of the present disclosure is configured to compute or estimate an object picking plan (e.g., grasping points and a direction of approach for picking or grasping) one or more the objects 22 based on information captured by the main camera 10 and the support cameras 30 (if present). The object picking plan computed by the object pick estimator 100 may then be supplied to a controller 28 for a robotic arm 24, which uses the object picking plan to generate a motion plan for moving the end effector 26 of the robotic arm to grasp or pick the selected object among the objects 22. According to various embodiments of the present disclosure, the object pick estimator 100 is implemented using one or more processing circuits or electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output, such as an instance segmentation mask and/or 6-DoF poses, from input images 40 (including, for example, polarization raw frames or the underlying images captured by polarization cameras or cameras with polarization filters in their optical paths). The operations performed by the object pick estimator 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the object pick estimator 100 may be referred to herein as a computer or a computer system, which may include memory storing instructions that, when executed by the one or more electronic circuits, implement the systems and methods described herein.

In more detail, the main camera 10 and the support cameras 30 are configured to capture images of scenes containing objects 22 within their fields of view 12 (while FIG. 1A illustrates a field of view 12 for the main camera 10 using dashed lines, the fields of view of the support cameras 30 are not explicitly shown). In the embodiment shown in FIG. 1A, the objects 22 are depicted abstractly as simple three-dimensional solids such as spheres, rectangular prisms, and cylinders. However, embodiments of the present disclosure are not limited thereto and object picking plans may be generated using any arbitrary object, including deformable objects mentioned above, such as flex circuits, bags or other pliable containers containing solids, liquids, and/or fluids, flexible tubing, and the like.

A "pose" refers to the position and orientation of an object with respect to a reference coordinate system. For example, a reference coordinate system may be defined with the main camera 10 at the origin, where the direction along the optical axis of the main camera 10 (e.g., a direction through the center of its field of view 12) is defined as the z-axis of the coordinate system, and the x and y axes are defined to be perpendicular to one another and perpendicular to the z-axis. (Embodiments of the present disclosure are not limited to this particular coordinate system, and a person having ordinary skill in the art would understand that poses can be mathematically transformed to equivalent representations in different coordinate systems.)

Each object 22 may also be associated with a corresponding coordinate system of its own, which is defined with respect to its particular shape. For example, a rectangular prism with sides of different lengths may have a canonical coordinate system defined where the x-axis is parallel to its shortest direction, z-axis is parallel to its longest direction, the y-axis is orthogonal to the x-axis and z-axis, and the origin is located at the centroid of the object 22.

Generally, in a three-dimensional coordinate system, objects 22 have six degrees of freedom—rotation around three axes (e.g., rotation around x-, y-, and z-axes) and translation along the three axes (e.g., translation along x-, y-, and z-axes). For the sake of clarity, symmetries of the objects 22 will not be discussed in detail herein, but may be addressed, for example, by identifying multiple possible poses with respect to different symmetries (e.g., in the case of selecting the positive versus negative directions of the z-axis of a right rectangular prism), or by ignoring some rotational components of the pose (e.g., a right cylinder is rotationally symmetric around its axis).

Based on a reference coordinate system (or camera space, e.g., defined with respect to a camera of the imaging system) and an object coordinate system (or object space, e.g., defined with respect to one of the objects), the pose of the object may be considered to be a rigid transform (rotation and translation) from object space to camera space. The pose of object 1 in camera space 1 may be denoted as $P_{c_1}^1$, and the transform from object 1 space to camera space may be represented by the matrix:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

where the rotation submatrix R:

$$R = \begin{bmatrix} R_{11} & R_{12} & R_{13} \\ R_{21} & R_{22} & R_{23} \\ R_{31} & R_{32} & R_{33} \end{bmatrix}$$

represents rotations along the three axes from object space to camera space, and the translation submatrix T:

$$T = \begin{bmatrix} T_1 \\ T_2 \\ T_3 \end{bmatrix}$$

represents translations along the three axes from object space to camera space.

If two objects—Object A and Object B—are in the same camera C coordinate frame, then the notation $P_{CA}$ is used to indicate the pose of Object A with respect to camera C and $P_{CB}$ is used to indicate the pose of Object B with respect to camera C. For the sake of convenience, it is assumed herein that the poses of objects are represented based on the reference coordinate system, so the poses of objects A and B with respect to camera space C may be denoted $P_A$ and $P_B$, respectively.

The pose of a particular object can be computed with respect to views from two different cameras. For example, images of Object A captured by a main camera C can be used to compute the pose $P_{CA}$ of Object A with respect to main camera C. Likewise, images of Object A captured by a first support camera $S_1$ can be used to compute the pose $P_{S_1A}$ of object A with respect to the support camera $S_1$. If the relative poses of main camera C and support camera $S_1$ are known, then the pose $P_{S_1A}$ can be transformed to the coordinate system of the main camera C.

Some aspects of embodiments of the present disclosure also relate to providing information to assist in the control of a robotic arm 24 having an end effector 26 that may be used to grasp and manipulate objects 22 without computing the poses (e.g., 6-degree of freedom poses) of the objects to be picked or grasped. The robotic arm 24, including its end effector 26, may be controlled by a robotic arm controller 28, which, in some embodiments, receives the object picking plan computed by the object pick estimator 100.

Sensing Hardware

In the embodiment shown in FIG. 1A, the object pick estimating system includes an imaging system including a main camera 10 and one or more support cameras 30. In some embodiments of the present disclosure, the main camera 10 includes a stereo camera. Examples of stereo cameras include camera systems that have at least two monocular cameras spaced apart from each other along a baseline, where the monocular cameras have overlapping fields of view and optical axes that are substantially parallel to one another. While embodiments of the present disclosure will be presented herein in embodiments where the main camera 10 and the support cameras 30 are passive cameras (e.g., that are not connected to a dedicated light projector and that instead use ambient lighting or other light sources), embodiments of the present disclosure are not limited thereto and may also include circumstances where one or more active light projector are included in the camera system, thereby forming an active camera system, where the active light projector may be configured to project structured light or a pattern onto the scene. The support cameras 30 may be stereo cameras, monocular cameras, or combinations thereof (e.g., some stereo support cameras and some monocular support cameras). In some embodiments, the main camera 10 and/or one or more support cameras 30 may include one or more time-of-flight depth camera systems.

The main camera 10 and the support cameras 30 may use the same imaging modalities or different imaging modalities, and each of the main camera 10 and support cameras 30 may capture images using one or more different imaging modalities. Examples of imaging modalities include monochrome, color, infrared, ultraviolet, thermal, polarization, and combinations thereof (e.g., polarized color, polarized infrared, unpolarized ultraviolet, etc.).

Figure 1B:
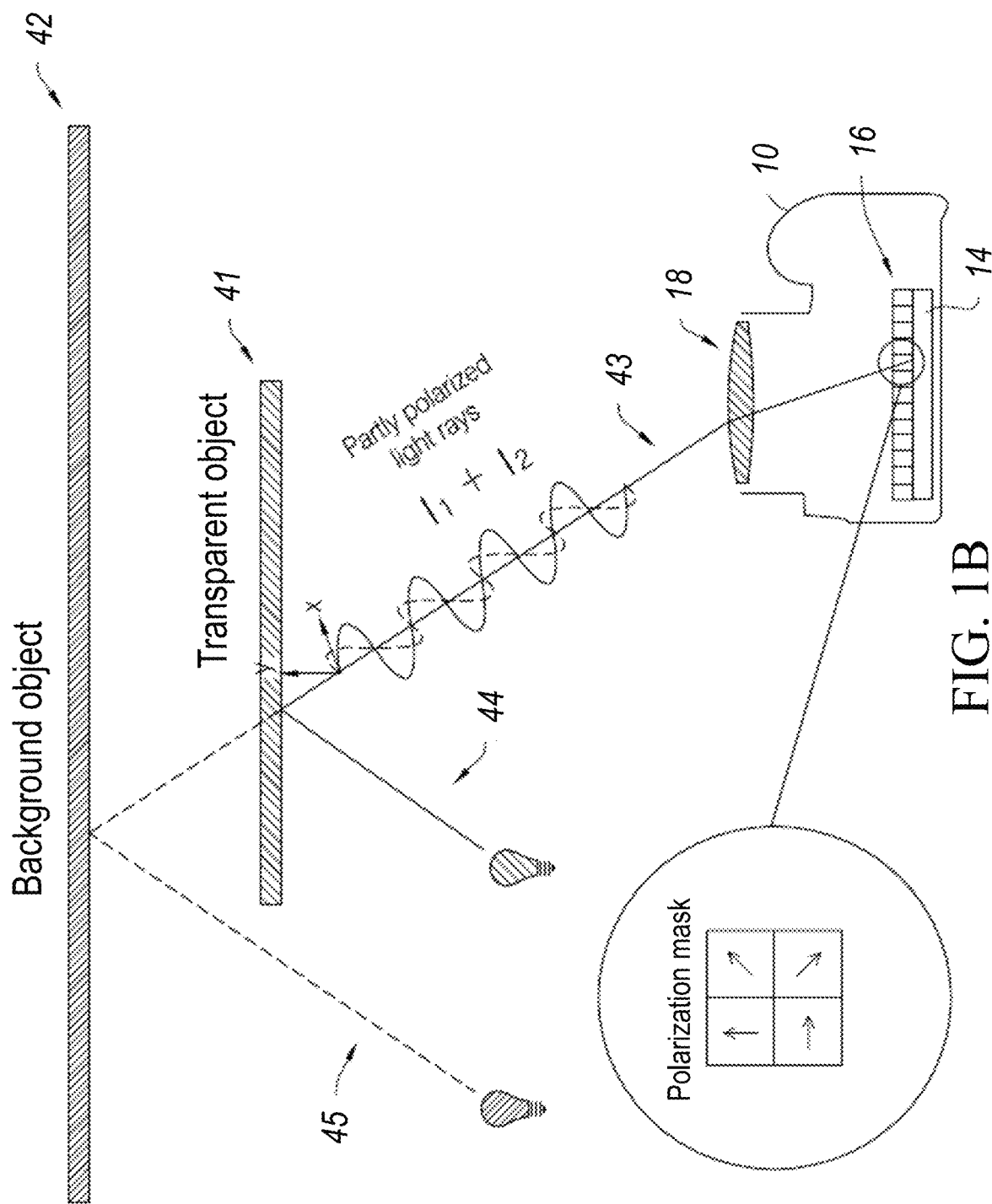
FIG. 1B is a high-level depiction of the interaction of light with transparent objects and non-transparent (e.g., diffuse and/or reflective) objects.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone:

FIG. 1B is a high-level depiction of the interaction of light with transparent objects and non-transparent (e.g., diffuse and/or reflective) objects. As shown in FIG. 1B, in some embodiments the main camera 10 includes a polarization camera 11 that captures polarization raw frames of a scene that includes a transparent object 41 in front of an opaque background object 42. A light ray 43 hitting the image sensor 14 of the polarization camera contains polarization information from both the transparent object 41 and the background object 42. The small fraction of reflected light 44 from the transparent object 41 is heavily polarized, and thus has a large impact on the polarization measurement, in contrast to the light 45 reflected off the background object 42 and passing through the transparent object 41.

Similarly, a light ray hitting the surface of an object may interact with the shape of the surface in various ways. For example, a surface with a glossy paint may behave substantially similarly to a transparent object in front of an opaque object as shown in FIG. 1B, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 43 hitting the image sensor 14 of a polarization camera has three measurable components: the intensity of light (intensity image/I), the percentage or proportion of light that is linearly polarized (degree of linear polarization/ DOLP/$\rho$), and the direction of that linear polarization (angle of linear polarization/AOLP/$\phi$). These properties encode information about the surface curvature and material of the object being imaged, which can be used by the object pick estimator 100 to detect transparent objects, as described in more detail below. In some embodiments, by using one or more polarization cameras, the object pick estimator 100 can detect the shapes of optically challenging objects (e.g., that include surfaces made of materials having optically challenging properties such as transparency, reflectivity, or dark matte surfaces) based on similar polarization properties of light passing through translucent objects and/or light interacting with multipath inducing objects or by non-reflective objects (e.g., matte black objects).

In more detail, the polarization camera 11 may further includes a polarizer or polarizing filter or polarization mask 16 placed in the optical path between the scene 1 and the image sensor 14. According to various embodiments of the present disclosure, the polarizer or polarization mask 16 is configured to enable the polarization camera 11 to capture images of the scene 1 with the polarizer set at various specified angles (e.g., at 45° rotations or at 60° rotations or at non-uniformly spaced rotations).

As one example, FIG. 1B depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 11 using a polarization mask 16 such as that shown in FIG. 1B is capable of concurrently or simultaneously capturing light at four different linear polarizations. One example of a polarization camera is the Blackfly® S Polarization Camera produced by FLIR® Systems, Inc. of Wilsonville, Oregon While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 11 with the polarizing filter mechanically rotated with respect to the lens 18 to transmit light at different angles of polarization to image sensor 14. Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 11 captures multiple input images (or polarization raw frames) of the scene including the surfaces of the objects 22. In some embodiments, each of the polarization raw frames corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera 11 located at a same location and orientation), as opposed to capturing the polarization raw frames from disparate locations and orientations with respect to the scene. The polarization camera 11 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

FIG. 2A is a perspective view of a camera array 10' according to one embodiment of the present disclosure. FIG. 2B is a cross sectional view of a portion of a camera array 10' according to one embodiment of the present disclosure. Some aspects of embodiments of the present disclosure relate to a camera array in which multiple cameras (e.g., cameras having different imaging modalities and/or sensitivity to different spectra) are arranged adjacent to one another and in an array and may be controlled to capture images in a group (e.g., a single trigger may be used to control all of the cameras in the system to capture images concurrently or substantially simultaneously). In some embodiments, the individual cameras are arranged such that parallax shift between cameras is substantially negligible based on the designed operating distance of the camera system to objects 2 and 3 in the scene 1, where larger spacings between the cameras may be tolerated when the designed operating distance is large.

FIG. 2B shows a cross sectional view of two of the cameras or camera modules 10A' and 10B' of the camera array 10' shown in FIG. 2A. As seen in FIG. 2B, each camera or camera module (10A' and 10B') includes a corresponding lens, a corresponding image sensor, and may include one or more corresponding filters. For example, in some embodiments, camera 10A' is a visible light color camera that includes lens 12A', image sensor 14A', and color filter 16A' (e.g., a Bayer filter). In the embodiment shown in FIG. 2B, the filter 16 is located behind the lens 12 (e.g., between the lens 12 and the image sensor 14), but embodiments of the present disclosure are not limited thereto. In some embodiments, the filter 16 is located in front of the lens 12, and in some embodiments, the filter 16 may include multiple separate components, where some components are located in front of the lens and other components are located behind the lens (e.g., a polarizing filter in front of the lens 12 and a color filter behind the lens 12). In some embodiments, camera 10B' is a polarization camera that includes lens 12B', image sensor 14B', and polarizing filter 16B' (a polarization camera may also include a visible light color filter or other filter for passing a particular portion of the electromagnetic spectrum, such as an infrared filter, ultraviolet filter, and the like). In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the filters 16 may correspond to different portions of a single physical layer that has different optical filter functions (e.g., different linear polarizing angles or circular polarizers, color filters with corresponding spectral response functions, and the like) in different regions of the layer (corresponding to the different cameras). In some embodiments, a filter 16 of a polarization camera includes a polarization mask 16 similar to the Sony® IMX250MZR sensor, which includes a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, a camera of the camera array 10' may use a polarization mask 16 to concurrently or simultaneously capture light at four different linear polarizations.

In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

As noted above, embodiments of the present disclosure relate to multi-modal and/or multi-spectral camera arrays. Accordingly, in various embodiments of the present disclosure, the cameras within a particular camera array include cameras configured to perform imaging in a plurality of different modalities and/or to capture information in a plurality of different spectra.

As one example, in some embodiments, the first camera 10A' is a visible light camera that is configured to capture color images in a visible portion of the electromagnetic spectrum, such as by including a Bayer color filter 16A' (and, in some cases, a filter to block infrared light), and the second camera 10B', third camera 10C', and fourth camera 10D' are polarization cameras having different polarization filters, such filters having linear polarization angles of 0°, 60°, and 120°, respectively. The polarizing filters in the optical paths of each of the cameras in the array cause differently polarized light to reach the image sensors of the cameras. The individual polarization cameras in the camera array have optical axes that are substantially perpendicular to one another, are placed adjacent to one another, and have substantially the same field of view, such that the cameras in the camera array capture substantially the same view of a scene as the visible light camera 10A', but with different polarizations. While the embodiment shown in FIG. 2A includes a 2×2 array of four cameras, three of which are polarization cameras, embodiments of the present disclosure are not limited thereto, and the camera array may more than three polarization cameras, each having a polarizing filter with a different polarization state (e.g., a camera array may have four polarization cameras along with the visible light color camera 10A', where the polarization cameras may have polarization filters with angles of linear polarization, such as 0°, 45°, 90°, and 135°). In some embodiments, one or more of the cameras may include a circular polarizer.

As another example, one or more of the cameras in the camera array 10' may operate in other imaging modalities and/or other imaging spectra, such as polarization, near infrared, far infrared, shortwave infrared (SWIR), longwave infrared (LWIR) or thermal, ultraviolet, and the like, by including appropriate filters 16 (e.g., filters that pass light having particular polarizations, near-infrared light, SWIR light, LWIR light, ultraviolet light, and the like) and/or image sensors 14 (e.g., image sensors optimized for particular wavelengths of electromagnetic radiation) for the particular modality and/or portion of the electromagnetic spectrum.

For example, in the embodiment of the camera array 10' shown in FIG. 2A, four cameras 10A', 10B', 10C', and 10D' are arranged in a 2×2 grid to form a camera array, where the four cameras have substantially parallel optical axes. In addition, the optical axes of the camera modules of the camera array are arranged close together such that the camera modules capture images from substantially the same viewpoint with respect to the objects in the scene 1. One of skill in the art would understand that the acceptable spacing between the optical axes of the camera modules within an array in order to capture images of the scene from substantially the same viewpoint depends on the working distance to objects 22 in the scene, where longer working distances allow for larger spacing between the optical axes while shorter working distances may require closer or tighter spacing between the optical axes. The four cameras may be controlled together such that they capture images substantially simultaneously. In some embodiments, the four cameras are configured to capture images using the same exposure settings (e.g., same aperture, length of exposure, and gain or "ISO" settings). In some embodiments, the exposure settings for the different cameras can be controlled independently from one another (e.g., different settings for each camera), where the object pick estimator 100 jointly or holistically sets the exposure settings for the cameras based on the current conditions of the scene 1 and the characteristics of the imaging modalities and spectral responses of the cameras 10A', 10B', 10C', and 10D' of the camera array 10'.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 390-402.) or a ChArUco target (see, e.g., An, Gwon Hwan, et al. "Charuco board-based omnidirectional camera calibration method." *Electronics* 7.12 (2018): 421.). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space). Different cameras within a camera array may have image sensors with different sensor formats (e.g., aspect ratios) and/or different resolutions without limitation, and the computed intrinsic and extrinsic parameters of the individual cameras enable the object pick estimator 100 to map different portions of the different images to a same coordinate space (where possible, such as where the fields of view overlap).

Figure 2C:
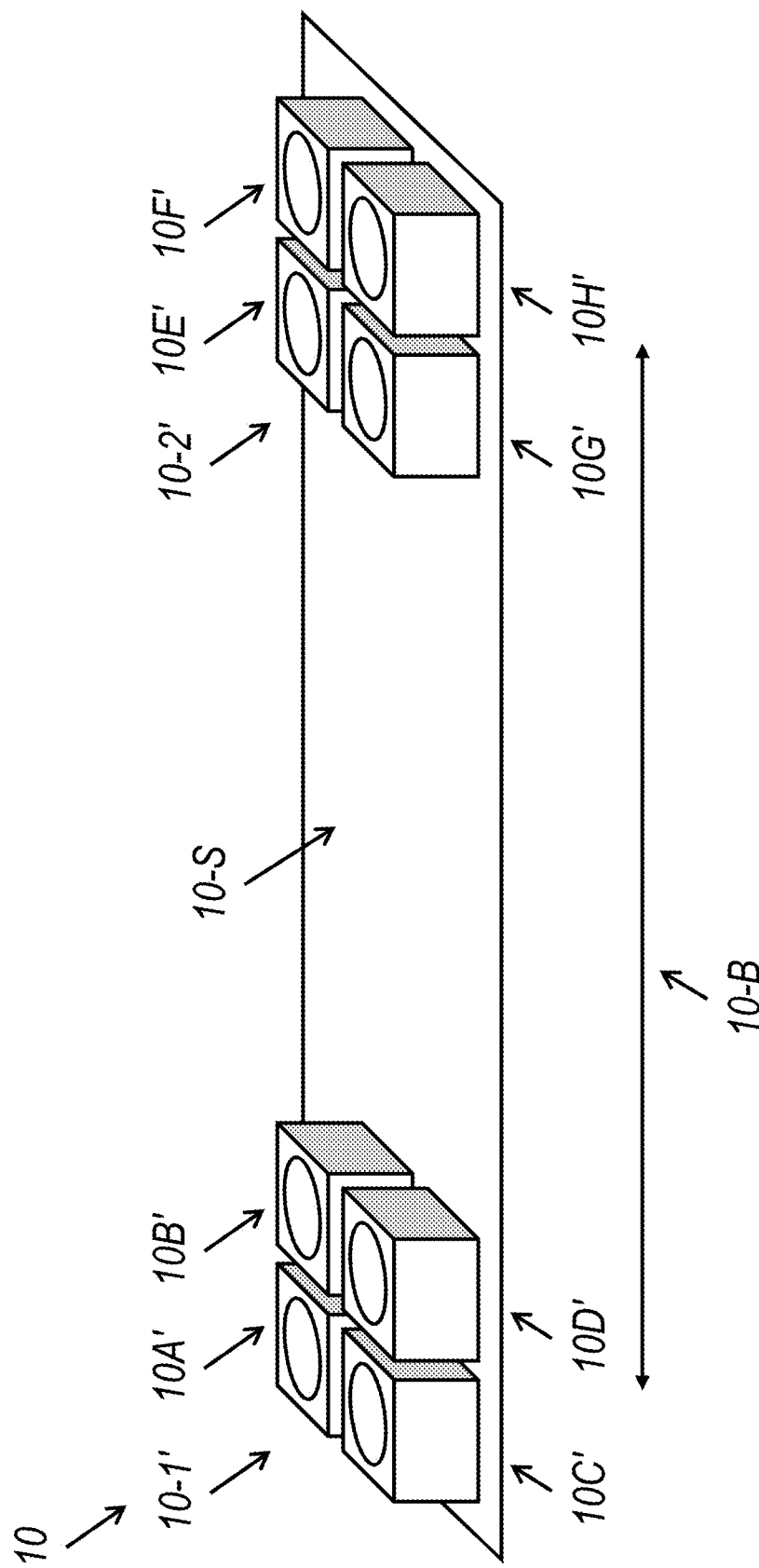
FIG. 2C is a perspective view of a stereo camera array system according to one embodiment of the present disclosure.

FIG. 2C is a perspective view of a stereo camera array system 10 according to one embodiment of the present disclosure. For some applications, stereo vision techniques are used to capture multiple images of scene from different perspectives. As noted above, in some embodiments of the present disclosure, individual cameras (or camera modules) within a camera array 10' are placed adjacent to one another such that parallax shifts between the cameras are small or substantially negligible based on the designed operating distance of the camera system to the subjects being imaged (e.g., where the parallax shifts between cameras of a same array are less than a pixel for objects at the operating distance). In addition, as noted above, in some embodiments, differences in the poses of the individual cameras within a camera array 10' are corrected through image registration based on the calibrations (e.g., computed intrinsic and extrinsic parameters) of the cameras such that the images are aligned to a same coordinate system for the viewpoint of the camera array.

In stereo camera array systems according to some embodiments, the camera arrays are spaced apart from one another such that parallax shifts between the viewpoints corresponding to the camera arrays are detectable for objects in the designed operating distance of the camera system. This enables the distances to various surfaces in a scene (the "depth") to be detected in accordance with a disparity measure or a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 2C depicts a stereo camera array system 10 having a first camera array 10-1' and a second camera array 10-2' having substantially parallel optical axes and spaced apart along a baseline 10-B. In the embodiments shown in FIG. 2C, the first camera array 10-1' includes cameras 10A', 10B', 10C', and 10D' arranged in a 2×2 array similar to that shown in FIG. 2A and FIG. 2B. Likewise, the second camera array 10-2' includes cameras 10E', 10F', 10G', and 10H' arranged in a 2×2 array, and the overall stereo camera array system 10 includes eight individual cameras (e.g., eight separate image sensors behind eight separate lenses). In some embodiments of the present disclosure, corresponding cameras of the camera arrays 10-1' and 10-2' are of the same type or, in other words, configured to capture raw frames or images using substantially the same imaging modalities or in substantially the same spectra. In the specific embodiment shown in FIG. 2C, cameras 10A' and 10E' may be of a same first type, cameras 10B' and 10F' may be of a same second type, cameras 10C' and 10G' may be of a same third type, and cameras 10D' and 10H' may be of a same fourth type. For example, cameras 10A' and 10E' may both have linear polarizing filters at a same angle of 0°, cameras 10B' and 10F' may both have linear polarizing filters at a same angle of 45°, cameras 10C' and 10G' may both be viewpoint-independent cameras having no polarization filter (NF), such as near-infrared cameras, and cameras 10D' and 10H' may both have linear polarizing filters at a same angle of 90°. As another example, cameras 10A' and 10E' may both be viewpoint-independent cameras such as visible light cameras without polarization filters, cameras 10B' and 10F' may both be thermal cameras, cameras 10C' and 10G' may both have polarization masks with a mosaic pattern polarization filters at different angles of polarization (e.g., a repeating pattern with polarization angles of 0°, 45°, 90°, and 135°), and cameras 10D' and 10H' may both be thermal (LWIR) cameras.

While some embodiments are described above wherein each array includes cameras of different types in a same arrangement, embodiments of the present disclosure are not limited thereto. For example, in some embodiments, the arrangements of cameras within a camera array are mirrored along an axis perpendicular to the baseline 10-B. For example, cameras 10A' and 10F' may be of a same first type, cameras 10B' and 10E' may be of a same second type, cameras 10C' and 10H' may be of a same third type, and cameras 10D' and 10G' may be of a same fourth type.

In a manner similar to that described for calibrating or registering cameras within a camera array, the various polarization camera arrays of a stereo camera array system may also be registered with one another by capturing multiple images of calibration targets and computing intrinsic and extrinsic parameters for the various camera arrays. The camera arrays of a stereo camera array system 10 may be rigidly attached to a common rigid support structure 10-S in order to keep their relative poses substantially fixed (e.g., to reduce the need for recalibration to recompute their extrinsic parameters). The baseline 10-B between camera arrays is configurable in the sense that the distance between the camera arrays may be tailored based on a desired or expected operating distance to objects in a scene—when the operating distance is large, the baseline 10-B or spacing between the camera arrays may be longer, whereas the baseline 10-B or spacing between the camera arrays may be shorter (thereby allowing a more compact stereo camera array system) when the operating distance is smaller.

As noted above with respect to FIG. 1B, a light ray 43 hitting the image sensor 14 of a polarization camera 10 has three measurable components: the intensity of light (intensity image/I), the percentage or proportion of light that is linearly polarized (degree of linear polarization/DOLP/ρ), and the direction of that linear polarization (angle of linear polarization/AOLP/φ).

Measuring intensity I, DOLP ρ, and AOLP ϕ at each pixel requires 3 or more polarization raw frames of a scene taken behind polarizing filters (or polarizers) at different angles, $\phi_{pol}$ (e.g., because there are three unknown values to be determined: intensity I, DOLP ρ, and AOLP ϕ. For example, a polarization camera such as those described above with respect to FIG. 1B captures polarization raw frames with four different polarization angles $\phi_{pol}$, e.g., 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$ and a camera module in accordance with some embodiments of FIGS. 2A, 2B, and 2C may capture polarization raw frames at three different polarization angles $\phi_{pol}$, e.g., 0 degrees, 60 degrees, and 120 degrees, thereby producing three polarization raw frames $I_{\phi_{pol}}$, denoted herein as $I_0$, $I_{60}$, and $I_{120}$.

The relationship between $I_{\phi_{pol}}$ and intensity I, DOLP ρ, and AOLP ϕ at each pixel can be expressed as:

$$I_{\phi_{pol}} = I(1 + \rho \cos(2(\phi - \phi_{pol}))) \quad (1)$$

Accordingly, with four different polarization raw frames $I_{\phi_{pol}}$ ($I_0$, $I_{45}$, $I_{90}$, and $I_{135}$), a system of four equations can be used to solve for the intensity I, DOLP ρ, and AOLP ϕ.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the ϕ and ρ components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \quad (2)$$

$$\phi = \theta_a \quad (3)$$

and when the specular reflection is dominant:

$$\rho = \frac{2\sin^2\theta_z\cos\theta_z\sqrt{n^2 - \sin^2\theta_z}}{n^2 - \sin^2\theta_z - n^2\sin^2\theta_z + 2\sin^4\theta_z} \quad (4)$$

$$\phi = \theta_a - \frac{\pi}{2} \quad (5)$$

Note that in both cases ρ increases exponentially as $\theta_z$ increases and if the refractive index is the same, specular reflection is much more polarized than diffuse reflection.

Accordingly, some aspects of embodiments of the present disclosure relate to applying SfP theory to detect or measure the gradients of surfaces (e.g., the orientation of surfaces or their surface normals or directions perpendicular to the surfaces) based on the raw polarization frames of the objects, as captured by the polarization cameras among the main camera 10 and the support cameras 30. Computing these gradients produces a gradient map (or slope map or surface normals map) identifying the slope of the surface depicted at each pixel in the gradient map. These gradient maps can then be used when estimating the shape and/or pose of the object by supplying these gradient maps or surface normals maps to a trained computer vision model (e.g., a convolutional neural network) and/or by aligning a pre-existing 3-D model (e.g., CAD model) of the object with the measured surface normals (gradients or slopes) of the object in based on the slopes of the surfaces of the 3-D model, as described in more detail below.

One example of an imaging system according to embodiments of the present disclosure includes a stereo pair of 2×2 camera arrays, in an arrangement similar to that shown in FIG. 2C, Each 2×2 camera array includes three color (RGB) cameras with polarization filters at different angles to capture a diverse range of polarization signatures of the scene in the spectral bands (red, green, and blue) and fourth near-IR camera without a polarization filter to capture the scene in the near-IR spectral band. This stereo pair of 2×2 camera arrays may be combined with other cameras located at different viewpoints with respect to the scene, thereby providing a multi-view imaging system. The other cameras may also be similar stereo camera arrays (e.g., similar stereo pairs of 2×2 camera arrays) or monocular camera arrays (e.g., single camera arrays of closely-spaced camera modules), and the camera arrays, in the stereo or monocular case, may have different arrangements and numbers of camera modules in the array (e.g., a 3×2 arrangement of 6 camera modules), and where the camera modules may operate in different modalities (e.g., thermal, ultraviolet, depth from time of flight, polarization, and the like).

Figure 3A:
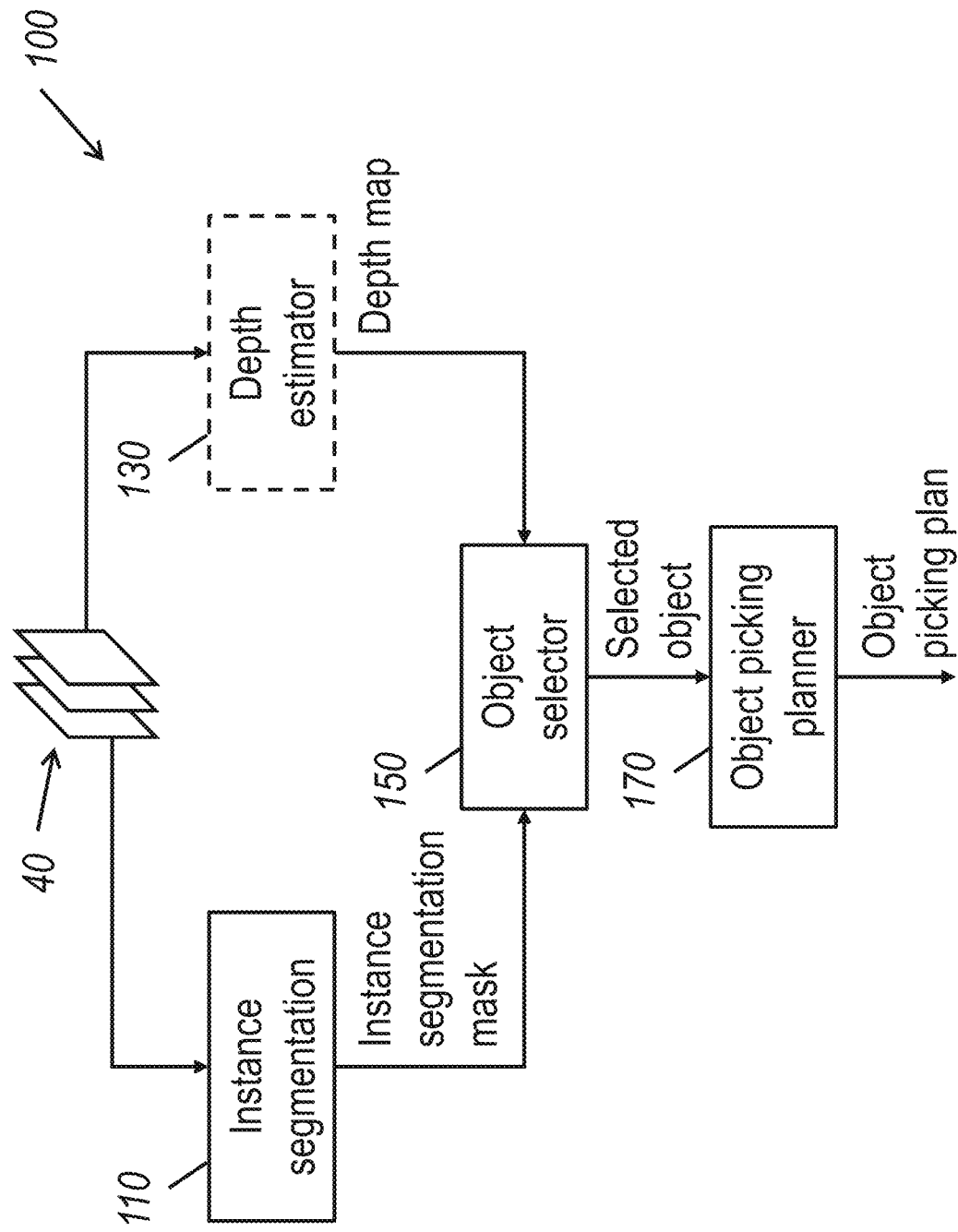
FIG. 3A is a block diagram of an object pick estimator according to one embodiment of the present disclosure.
Figure 3B:
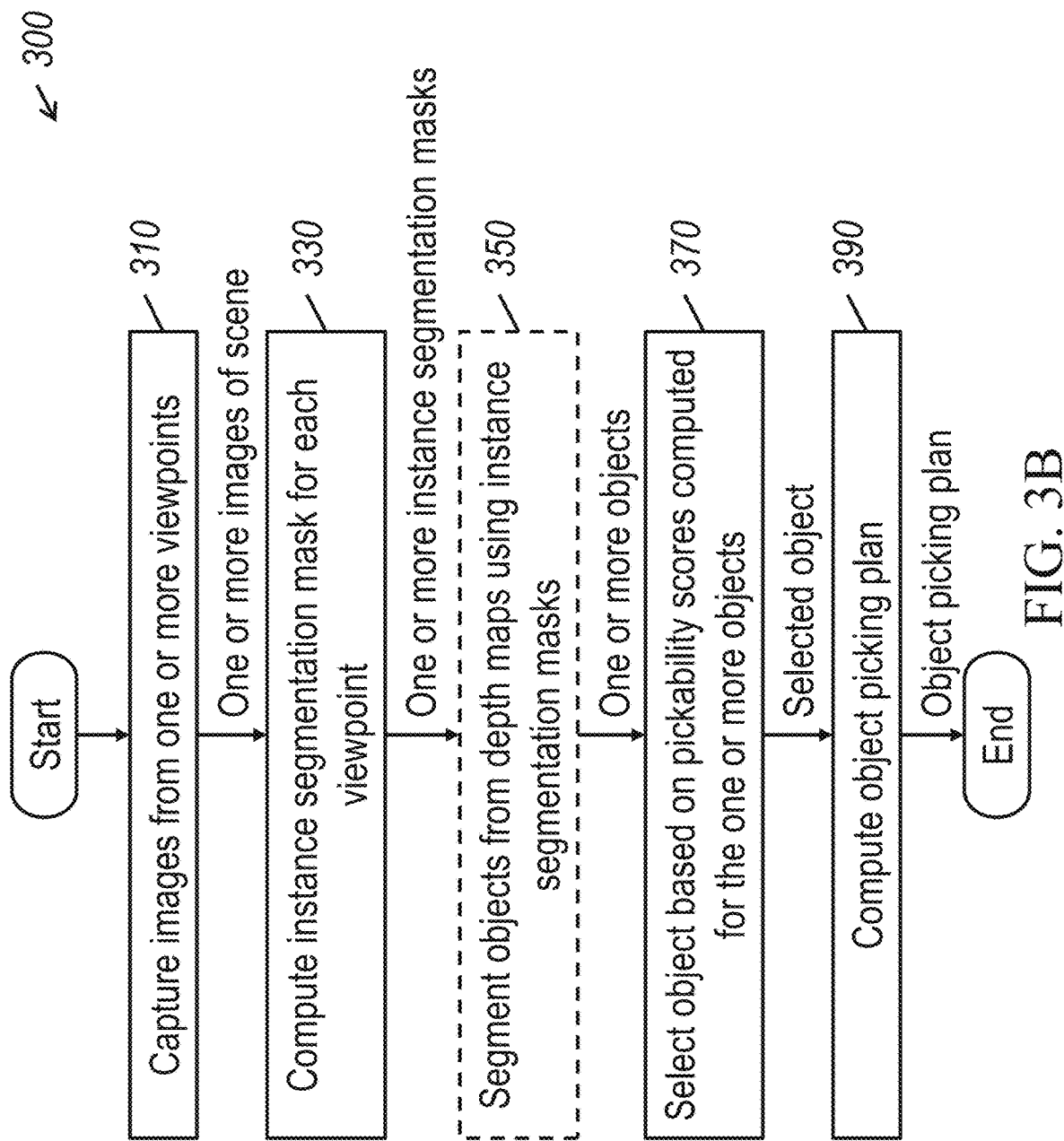
FIG. 3B is a flowchart depicting a method for computing object pick estimates according to some embodiments of the present disclosure.

FIG. 3A is a block diagram of an object pick estimator according to one embodiment of the present disclosure. FIG. 3B is a flowchart depicting a method for computing object pick estimates according to some embodiments of the present disclosure.

As shown in FIG. 3B, in operation 310, the object pick estimator 100 controls one or more cameras, such as the main camera 10 and the support cameras 30, to capture one or more images of the scene, which may be from multiple viewpoints in the case of multiple cameras. In embodiments using multiple cameras, the cameras are configured to capture images concurrently or substantially simultaneously. In the case of in imaging system that includes multiple cameras, each camera is arranged at a different pose with respect to the scene 1, such that each camera captures scene from its corresponding different viewpoint. Accordingly, the collection of images captured by multiple cameras represent a collection of multi-viewpoint images of the scene 1. (In some embodiments, the images are captured from multiple viewpoints using one or more cameras, such as by moving the one or more cameras between different viewpoints while keeping the scene fixed, and/or rigidly transforming the scene between captures by the one or more cameras.) The one or more images of the scene may be referred to herein as being "consistent" in that they are all pictures of the same consistent scene but providing different views of the scene from different viewpoints and/or different imaging modalities. This consistency between the images of the scene may be achieved by capturing all of the images substantially simultaneously or concurrently or by requiring that none of the objects of interest in the scene that are depicted in the image have moved (e.g., translated or rotated) between in the time between the capture of different images of the scene.

In some circumstances, one or more of the "cameras" are multi-modal cameras that capture multiple images from the same viewpoint, but having different modalities, such as different portions of the electromagnetic spectrum (e.g., red, green and blue portions of the visible light spectrum, near infrared light, far infrared light, ultraviolet light, etc.), different optical filters (e.g., linear polarization filters at different angles and/or circular polarization filters), and combinations thereof. Accordingly, a collection of multi-viewpoint images of a scene does not require that all images be captured from different viewpoints, but only that there are at least two images captured from different viewpoints. Such a collection of multi-viewpoint images therefore may include at least some images that are captured from the same viewpoint.

For the sake of exposition, the following discussion presents an embodiment where the imaging system includes only one camera, referred to as main camera 10, where the main camera 10 may include multiple camera modules (e.g., a multi-modal stereo camera such as that shown in FIG. 2C). Further embodiments of the present disclosure using multi-view capture (e.g., using a main camera 10 along with one or more support cameras 30) will be described in more detail following the discussion of embodiments using a single camera.

As shown in FIG. 3A, an object pick estimator 100 according to some embodiments of the present disclosure is configured to receive the one or more input images 40 captured by the imaging system including the main camera 10.

In operation 330, the object pick estimator 100 supplies the one or more images to an instance segmentation module 110 configured to compute instance segmentation masks based on input images. In more detail, aspects of embodiments of the present disclosure relate to the use of instance segmentation algorithms and trained instance segmentation networks that compute instance segmentation masks from supplied two-dimensional intensity images (e.g., color intensity images, such as red, green, blue (RGB) intensity images and/or monochrome intensity images). In some embodiments, the instance segmentation networks are existing, previously-trained instance segmentation convolutional neural networks that take 2-D intensity images as input and compute instance segmentation masks from the 2-D intensity images, where the instance segmentation masks label pixels of the images as being associated with a same instance of an object (e.g., assigning different instance identifiers to two different dogs appearing in an image), and may also label each instance with an object class (e.g., dogs, cats, people, cars, and the like).

The instance segmentation module 110 may include convolutional neural network backbones such as those described in Mask R-CNN (He, Kaiming, et al. "Mask R-CNN." *Proceedings of the IEEE International Conference on Computer Vision*. 2017.), AlexNet (see, e.g., Krizhevsky, Alex, Ilya Sutskever, and Geoffrey E. Hinton. "ImageNet classification with deep convolutional neural networks." Advances in neural information processing systems. 2012.), VGG (see, e.g., Simonyan, Karen, and Andrew Zisserman. "Very deep convolutional networks for large-scale image recognition." arXiv preprint arXiv:1409.1556 (2014).), Res-Net-101 (see, e.g., Kaiming He, Xiangyu Zhang, Shaoqing Ren, and Jian Sun. Deep residual learning for image recognition. In Proceedings of the IEEE Conference on Computer Vision and Pattern Recognition, pages 770-778, 2016.), MobileNet (see, e.g., Howard, Andrew G., et al. "Mobilenets: Efficient convolutional neural networks for mobile vision applications." arXiv preprint arXiv:1704.04861 (2017).), MobileNetV2 (see, e.g., Sandler, Mark, et al. "MobileNetV2: Inverted residuals and linear bottlenecks." Proceedings of the IEEE Conference on Computer Vision and Pattern Recognition. 2018.), and MobileNetV3 (see, e.g., Howard, Andrew, et al. "Searching for MobileNetV3." Proceedings of the IEEE International Conference on Computer Vision. 2019.), although embodiments of the present disclosure are not limited thereto. The feature pyramid network (FPN) 814 (see, e.g., Lin, Tsung-Yi, et al. "Feature pyramid networks for object detection." *Proceedings of the IEEE Conference on Computer Vision and Pattern Recognition*. 2017.) enables the capture of multiscale features in the images (e.g., distinctive features of objects appearing at different sizes within the image), although embodiments of the present disclosure are not limited thereto, and other networks for capturing multiscale features may be used, such as a U-Net (see, e.g., Ronneberger, Olaf, Philipp Fischer, and Thomas Brox. "U-Net: Convolutional networks for biomedical image segmentation." *International Conference on Medical Image Computing and Computer-Assisted Intervention*. Springer, Cham, 2015.) or a DeepMask (Pinheiro, Pedro O., et al. "Learning to Segment Object Candidates." ArXiv:1506.06204 [Cs], September 2015. arXiv.org, http://arxiv.org/abs/1506.06204.).

In embodiments where the imaging system includes one or more polarization cameras, the images 40 include polarized images, and the instance segmentation module 110 may include a Polarized CNN backbone as described in PCT Patent Application No. PCT/US2020/048604, also filed as U.S. patent application Ser. No. 17/266,046, the content of which is incorporated herein by reference. Additional details regarding polarization CNN backbones is presented in a later section. The use of polarized images enables the detection and segmentation of optically-challenging objects that would otherwise be difficult (e.g., unreliable) to detect using standard color imaging techniques. Examples of optically challenging objects include objects that are transparent (e.g., glass or transparent plastic), highly reflective (e.g., shiny metallic surfaces, highly polished painted surfaces, mirrored surfaces, surfaces with specular reflections, and the like), dark matte surfaces (e.g., black rubber), and the like.

In some embodiments, the object pick estimator 100 includes a depth estimator 130 configured to compute one or more depth maps from the input images 40. These depth maps may be computed using any of a variety of techniques such as depth from stereo, depth from time of flight, and the like. For example, in the case of depth from stereo, the one or more images 40 includes a stereoscopic pair of images captured by a stereo pair (e.g., as shown in FIG. 2C), and a depth estimator 130 computes a disparity map from the stereoscopic pair of images, such as by performing block matching along epipolar lines or by using a trained disparity network. The disparity map generally indicates amount by which particular portions of the image have exhibited a parallax shift between the views of the two members of the stereo pair, where a larger parallax shift or larger disparity indicates that the corresponding imaged surfaces are closer to the depth camera and smaller disparities indicates that the corresponding imaged surfaces are farther from the depth camera. Accordingly, a depth camera can compute a 2.5D depth map where each pixel in the depth map indicates the estimated distance to the imaged surface, and where the depth map can be represented as a point cloud of 3-D points. As another example, in the case of time of flight, the depth estimator 130 computes the depth map based on differences between the arrival times of light in the various pixels in response to projecting coded light into the scene (e.g., based on a delay time of a pulse of light or based on a phase shift in projected light that varies sinusoidally in intensity over time).

In operation 350, in embodiments where the object pick estimator 100 has access to depth maps (e.g., as computed by a depth estimator 130), the object pick estimator 100 segments the depth map based on the instance segmentation mask computed in operation 330.

In more detail, continuing the above example where the main camera 10 is a stereo array camera, the instance segmentation mask and the depth map may be computed based on images (e.g., color images, polarization raw frames, and the like) captured by the same main camera 10, and therefore are captured from the same viewpoint. As such, the instance segmentation mask may be used to directly identify the pixels (or 3-D points) of the depth map that correspond to the same instances of objects. For example, an instance segmentation mask may identify three different boxes and assign arbitrary example labels 'A', 'B', and 'C' to the pixels of the instance segmentation mask that correspond to the three different boxes in a captured 2-D image (e.g., a 2-D color intensity image). Each pixel of a depth map encodes a distance between the camera and a depicted surface of scene 1, but does not encode information about which points of the depth map correspond to different objects (e.g., the depth map may encode the shapes of the different boxes in the scene, but does not encode semantic information such as whether the boxes are parts of a same object or multiple different objects). When the depth map and the instance segmentation mask depict the same scene from the same viewpoint, then each portion of the instance segmentation mask assigns an object instance to corresponding portions of the depth map, thereby labeling the points of the depth map with semantic information about the scene, such as the class of object and an instance identifier (e.g., labeling depth points corresponding to the shapes of three boxes in the scene with different labels such as 'A', 'B', and 'C').

In addition, in embodiments where the depth map and the instance segmentation mask are captured from different viewpoints, the object pick estimator 100 re-projects the points in the point cloud of the depth map to the viewpoint of the images used to compute the instance segmentation mask (in accordance with extrinsic camera parameters of the cameras used to capture the images used to capture the instance segmentation mask and the images used to generate the depth map), thereby enabling the instance segmentation mask to identify which points of the depth map correspond to the different detected instances of objects.

Accordingly, in embodiments where the object pick estimator 100 has access to a depth map of the scene, in operation 350 the object pick estimator 100 segments objects in the depth maps using instance segmentation masks computed directly from 2-D images (e.g., color intensity images, monochrome intensity images, polarization raw frames, polarization signatures, and the like) of the scene.

In operation 370, the object selector 150 of the object pick estimator 100 selects an object to be picked based on object pickability scores computed for the one or more objects detected through operation 330 and/or operation 350. In particular, the object pickability scores represent an estimated ease of picking up an object using a particular robotic arm 24 with a particular end effector 26 (e.g., an end effector with gripping fingers or an end effector with a suction gripper). In the discussion herein, a high pickability score indicates an object that is more easily pickable, while a low pickability score indicates an object that is more difficult to pick. For example, objects that are underneath or blocked by objects above them may be effectively unpickable in the current state of the bin and would have very low pickability scores, whereas objects that are on top of a pile and that are laterally spaced from other objects may have high pickability scores.

Aspects of embodiments of the present disclosure relate to computing pickability scores of objects using instance segmentation masks and, if available, depth maps of a scene containing objects, without additionally computing the poses (e.g., 6-DoF poses) of the objects to be picked.

For the sake of discussion, all of the objects x detected in a scene (e.g., detected by the instance segmentation module 110 in operation 330) may be represented by a set X. For each object x in the set, $x_{mask}$ is the set of pixels that belong to object x, as identified by the instance segmentation mask. In addition, $x_{cloud}$ is a point cloud of 3-D points (e.g., having x, y, and z coordinates) selected from the points in a depth map, as filtered or extracted from the depth map by the portion of the instance segmentation mask $x_{mask}$ corresponding to that object x. The current location (e.g., 3-D coordinates) of the end effector 26 or gripper of the robot arm 24 may be represented by R.

In some embodiments of the present disclosure, the pickability score PS of an object x is defined as:

$$PS(x) = k_1 |x_{mask}| + k_2 P_{clutter}(x) - k_3 P_{prox}(x) + k_4 P_{outness}(x) \quad (6)$$

where the parameters k are parameters that are tuned for particular deployment environments (e.g., based on characteristics such as the shapes of the objects to be picked and the gripping methods used by the end effectors). $|x_{mask}|$ represents the number of pixels of the instance segmentation mask that correspond to the current object x.

In the definition of pickability score PS above, $P_{clutter}(x)$ is a measure of the clutter in the neighborhood of object x. In some embodiments, $P_{clutter}(x)$ is calculated using the detected point clouds and/or depth maps by comparing the center of mass (a three-dimensional coordinate computed based on the mean coordinate of the point cloud of the object) of the current object x with the center of mass of each other detected object z:

$$P_{clutter}(x) = \sum_{z \in X} \max(d, \|\text{mean}(x_{cloud}) - \text{mean}(z_{cloud})\|) \quad (7)$$

where d is a tunable parameter.

$P_{prox}(x)$ in the definition above is a measure of the distance of the object from the current position R of the end effector 26 of the robot arm 24, predicted by the center of the detected point cloud $x_{cloud}$ of the object x. In particular, this factor is used to favor closer objects, thereby reducing the cycle time by reducing the movements of the robot arm:

$$P_{prox}(x) = \|\text{mean}(x_{cloud}) - R\| \quad (8)$$

$P_{outness}(x)$ in the definition above is a measure of how much an object "sticks out" or protrudes from among the other objects in the bin. Intuitively, objects that protrude more from the other objects in a bin are easier to grasp than objects that are buried or otherwise blocked by other objects. In some embodiments, when computing a pickability score for an object x, the object selector 150 of the object pick estimator 100 defines a neighborhood of points N(x) around the object x but that are not a part of x. A plane p is then fit to these points, and $P_{outness}$ computes a measure of how far x extends out of the plane p (and toward the position R of the end effector 26):

$$P_{outness}(x) = signum\left(R - proj(R)\right) \sum_{q \in x_{cloud}} \left(q - proj(q)\right)^3 \quad (9)$$
$$p \qquad\qquad p$$

Accordingly, an object x' may be selected from the detected objects X by identifying the object having highest pickability score:

$$x' = \underset{x \in X}{\mathrm{argmax}} PS(x) \quad (10)$$

While the preceding discussion describes computing a pickability score PS using both an instance segmentation mask and a depth map according to some embodiments of the present disclosure, embodiments of the present disclosure are not limited thereto.

For example, in some embodiments, the pickability score PS includes a factor relating to the blocking of the object by other objects in the scene, which may be determined based on portions of the object being occluded from the view by other objects in the scene.

As another example, in some embodiments, the pickability score PS includes a score relating to the reachability of the object and/or whether the object is graspable using the end effector 26 installed on the robot arm 24 that is guided by the object pick estimator 100. For example, in the case of an end effector having a finger gripper, the pickability analysis may further include a determination of whether the fingers of the gripper can reach the lateral surfaces of the object x. As one example, this factor may include a finger insertion point analysis described in Nishina Yuki, et al. "Model-less Grasping Points Estimation for Bin-Picking of Non-Rigid Objects and Irregular-Shaped Objects." Omron Technics. Vol. 52.012EN (2020).

As another example, in the case of a suction-based gripper, the analysis may include determining a shape of the object, such as from the depth map or from a surface normals map computing using shape from polarization based on captured polarization raw frames, to detect surfaces of the object x that are suitably-shaped for gripping by a suction gripper (e.g., sufficiently flat and smooth surfaces of the object).

As a further example, in some embodiments of the present disclosure, the pickability score is computed from an instance segmentation mask alone (e.g., without also using a depth map). In some such embodiments, the terms of the pickability score PS that require or use the depth map are modified to remove the reliance on the depth map.

For example, the $P_{clutter}(x)$ factor may be modified to compute the distances to neighboring objects based solely on the distance between the objects in two-dimensional space (e.g., the centers of their respective masks):

$$P_{clutter}(x) = \sum_{z \in X} \max(d, \|\mathrm{mean}(x_{mask}) - \mathrm{mean}(z_{mask})\|) \quad (11)$$

and, likewise, the $P_{mask}$ factor may be computed based on distance within a plane parallel to the image plane $p_{mask}$ of the instance segmentation mask:

$$P_{prox}(x) = \left\|\mathrm{mean}(x_{mask}) - \underset{p_{mask}}{proj(R)}\right\| \quad (12)$$

In some embodiments where a pickability score is computed based on 2-D images (e.g., an instance segmentation mask) alone, the object selector 150 may further include an object pickability network (or object pickability neural network) that is trained to compute object pickability scores based on a supplied instance segmentation mask. For example, in some embodiments the object pickability network is trained to classify each instance of an object into one of a plurality of different pickability scores (e.g., "low pickability," "moderate pickability," and "high pickability") or may be configured to compute a numerical pickability score (e.g., a normalized value from 0.0 to 1.0, where 0.0 represents a "difficult" pickability score and 1.0 represents an "easy" pickability score). In addition to an instance segmentation mask, the object pickability network may further take additional inputs such as the captured images 40

In some embodiments, the object pickability network is trained based on labeled training data, where the labels are pickability scores previously computed based on the pickability scores described above. For example, depth maps may be used along with instance segmentation masks for computing the pickability scores of objects when generating the training dataset, and the depth maps are omitted from the training data set, such that the instance segmentation masks (and, in some embodiments, other captured images) are included along with the calculated pickability scores when training the object pickability network. In some embodiments, the training dataset is further refined based on whether an actual robotic arm was able to pick the object (e.g., data points where the object pickability score was high but the robot arm 24 failed to pick the object may be removed or revised to indicate a low object pickability score).

In addition, in some embodiments of the present disclosure that include the use of depth maps, the object pickability network is trained to predict object pickability scores based on an instance segmentation mask and a depth map supplied as inputs.

In operation 390, the object picking planner 170 of the object pick estimator 100 computes an object picking plan for picking the selected object (e.g., the object selected by the object selector 150 in operation 370).

In one example embodiment, an object picking planner 170 of the object pick estimator 100 implements a grasp planner for a robotic arm based on the topography of the bin (as identified in a depth map) and identification of which object is associated with each depth estimate (through the instance segmentation mask).

In some embodiments, the object picking planner 170 computes the "visible center of mass" of an object x by computing the average or mean point within $x_{cloud}$:

$$\text{visible center of mass} = \mathrm{mean}(x_{cloud}) \quad (13)$$

Because some portions of the object may not be visible to the camera, the actual center of mass is likely to be farther from the camera than the visible center of mass. Accordingly, in some embodiments of the present disclosure, the estimated center of mass $\bar{x}$ is also adjusted by a scalar value k to be farther from the camera used to capture the images of the scene (assuming a coordinate system aligned with the camera):

$$\bar{x} = \mathrm{mean}(x_{cloud}) + [k\ k\ k]^T \quad (14)$$

where k is a tunable parameter.

As such, in some embodiments of the present disclosure, the object picking planner 170 determines a target picking position based on the estimated center of mass $\bar{x}$, such as by directing the end effector (e.g., a center of the end effector between the multiple fingers of the end effector or a center of a suction end effector) toward the estimated center of mass $\bar{x}$ of the object x.

Some aspects of embodiments of the present disclosure also relate to computing a direction of approach for the end effector 26 of the robotic arm 24 toward the calculated picking position. In some embodiments, a plane p is fit to a neighborhood of points N(x) surrounding and including $x_{cloud}$. The direction normal (perpendicular or orthogonal) to the plane p may then be represented as $\vec{v}$, and the direction opposite to the normal vector may be used as the direction of approach $(-\vec{v})$.

In some embodiments of the present disclosure, the direction of approach also depends on the presence of other objects as detected in the scene, such as avoiding collisions with other objects in the scene. For example, in the case of a gripper using fingers, nearby objects may prevent the gripper from reaching some of the lateral sides of a particular object, while other lateral sides of the object may be unobstructed. Accordingly, finger insertion points (see, e.g., Nishina Yuki, et al. "Model-less Grasping Points Estimation for Bin-Picking of Non-Rigid Objects and Irregular-Shaped Objects." Omron Technics. Vol. 52.012EN (2020).) may be determined from the depth map and/or based on the distances to neighboring objects to select an approach direction and orientation for the end effector to approach the object x.

In some embodiments of the present disclosure, the object picking planner 170 selects an approach direction based on other or additional criteria such as surface normals of the object x. For example, a finger gripper may be oriented such that the fingers of the gripper apply force along a direction that is substantially perpendicular to lateral surface of the object. As another example, a suction gripper may approach a surface of the object along a direction that is substantially perpendicular to the surface to improve contact.

Multi-Viewpoint Object Picking Estimation

Some aspects of embodiments of the present disclosure were described above in the context of computing an object picking plan for an object from a collection of objects, based on an instance segmentation mask viewing the objects from a single viewpoint. However, embodiments of the present disclosure are not limited thereto.

For example, in the case of an imaging system with multiple cameras (e.g., a main camera 10 and one or more support cameras 30) imaging a scene of objects from multiple different viewpoints, a separate instance segmentation mask can be calculated from each of the different viewpoints. Likewise, if applicable, a separate depth map may be calculated from each of these different viewpoints. In some embodiments, the object selector 150 computes pickability scores independently based on the instance segmentation masks (and, if applicable, the depth maps) captured for each of the viewpoints. This may result in multiple pickability scores being calculated for a same object that is visible from move than one viewpoint. However, the pickability scores may differ from the different viewpoints, based on the particular arrangement of the object with respect to its neighboring objects. The object selector 150 may then select an object to be picked based on the pickability scores aggregated across the objects visible in the different views.

According to some embodiments of the present disclosure, the object selector computes object-level correspondences between the objects depicted in different views. In other words, instances of the same object that are detected in multiple views are semantically connected, and a pickability score for the object is computed based on the combination of information from the different viewpoints. Some techniques for computing object-level correspondences are described in more detail below.

For example, in some embodiments, depth maps from multiple viewpoints are merged (e.g., based on known extrinsic parameters of the different cameras of the imaging system) and therefore more detailed and complete point clouds $x_{cloud}$ may be computed for the objects in the scene. These point clouds may then be used to compute more accurate pickability scores PS for the objects.

The object pick estimator 100 outputs the object picking plan computed in operation 390 to a robot controller 28, which uses the object picking plan (including, for example, the picking position and the direction of approach) to control a robot arm 24 to move the end effector 26 to the object to pick the object up. The particular details of the motion plan is specific to characteristics of the robot arm 24 (e.g., the particular dimensions and arrangements of the mechanical linkages of the robot arm 24) as well as its current position R.

Computing Object-Level Correspondences

In the case of a sensing system using multi-viewpoint images or images of a scene from more than one viewpoint, in operation 330, the object pick estimator 100 computes object-level correspondences on the multi-viewpoint images of the scene. More specifically, instances of one or more types of objects are identified in the multi-viewpoint images of the scene, and corresponding instances of objects are identified between the multi-viewpoint images. For example, a scene 1 may include two cubes and three spheres, and various of the multi-viewpoint images may depict some or all of these five objects. A process of instance segmentation identifies the pixels in each of the images that depict the five objects, in addition to labeling them separately based on the type or class of object (e.g., a classification as a "sphere" or a "cube") as well as instance labels (e.g., assigning a unique label to each of the objects, such as numerical labels "1," "2," "3," "4," and "5"). Computing object-level correspondences between the multi-viewpoint images further relates to computing consistent labels between the different viewpoints (for example, such that the same cube is labeled "1" from each of the viewpoint). Accordingly, the object pick estimator 100 generates collections of crops or patches of the multi-viewpoint images of the scene, where each collection of patches depicts the same instance from different viewpoints (cropped to the region containing the object and, in some cases, a small neighborhood or margin around the object).

In the case of a single image depicting a scene from a single viewpoint, in operation 330, the object pick estimator 100 may merely compute an instance segmentation mask, which similarly enables the generation of a crop or patch for each object instance detected in the image.

Systems and methods for computing object-level correspondences are described in International Patent Application No. PCT/US21/15926, titled "SYSTEMS AND METHODS FOR POSE DETECTION AND MEASUREMENT," filed in the United States Patent and Trademark Office on Jan. 29, 2021, which is incorporated by reference herein in its entirety. For the sake of clarity, some techniques for computing object-level correspondences on images are described herein with reference to FIGS. 4A, 4B, and 4C.

In general terms, computing object-level correspondences reduces a search space for conducting image processing tasks such as, for example, pixel-level correspondence. In one embodiment, instance segmentation is performed to identify different instances of objects in images portraying a scene as viewed from different viewpoints, and instance segmentation maps/masks may be generated in response to the instance segmentation operation. The instance segmentation masks may then be employed for computing object level correspondences.

In one embodiment, object level correspondence allows the matching of a first instance of an object appearing in a first image that depicts a view of a scene from a first viewpoint, to a second instance of the same object appearing in a second image that depicts a view of a scene from a second viewpoint. Once object level correspondence is performed, the search space for performing, for example, pixel-level correspondence, may be limited to the regions of the image that correspond to the same object. Reducing the search space in this manner may result in faster processing of pixel-level correspondence and other similar tasks.

Figure 4A:
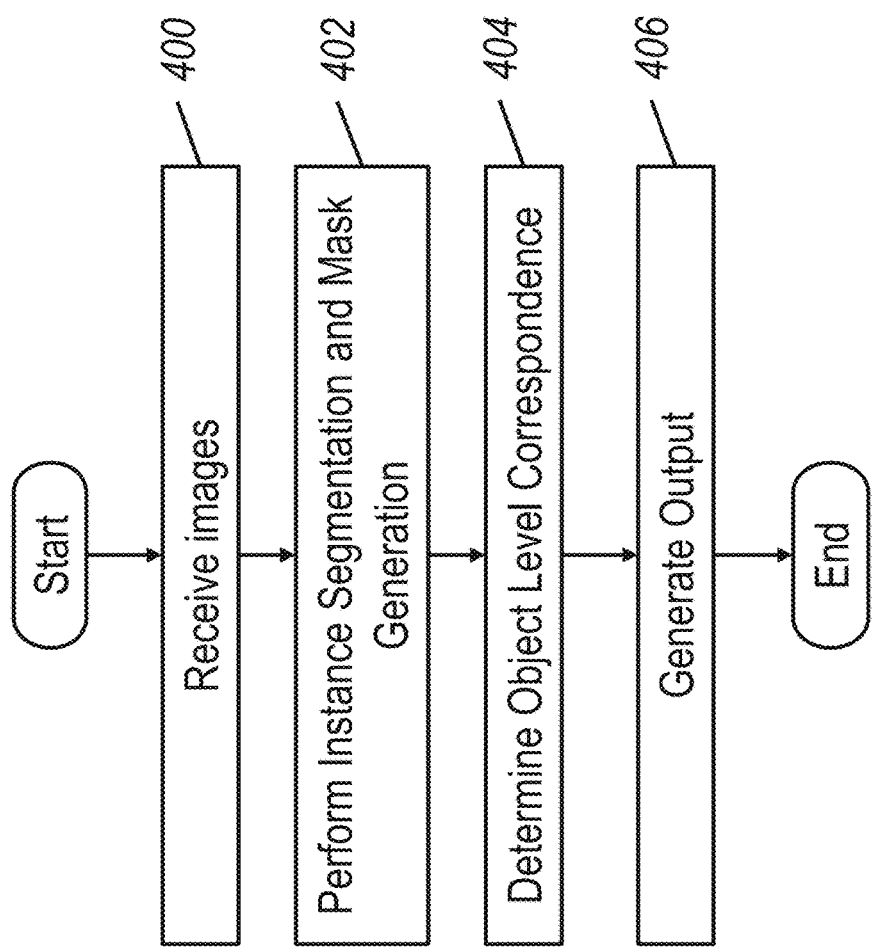
FIG. 4A is a flow diagram of a process for object level correspondence according to one embodiment.

FIG. 4A is a flow diagram of a process for object level correspondence according to one embodiment. The process may be implemented by one or more processing circuits or electronic circuits that are components of the object pick estimator 100. It should be understood that the sequence of steps of the process is not fixed, but can be modified, changed in order, performed differently, performed sequentially, concurrently, or simultaneously, or altered into any desired sequence, as recognized by a person of skill in the art. The process described with respect to FIG. 4A may be used, in some embodiments of the present disclosure, to compute object level correspondences in operation 330 of FIG. 3B, but embodiments of the present disclosure are not limited thereto.

The process starts, and at block 400, the object pick estimator 100 receives multi-view images from the main and support cameras 10, 30. A first image captured by one of the cameras may depict one or more objects in a scene from a first viewpoint, and a second image captured by a second camera may depict the one or more objects in the scene from a second viewpoint different from the first viewpoint. The images captured by the cameras may be, for example, polarized images and/or images that have not undergone any polarization filtering.

At block 402 the object pick estimator 100 performs instance segmentation and mask generation based on the captured images. In this regard, the object pick estimator 100 classifies various regions (e.g. pixels) of an image captured by a particular camera 10, 30 as belonging to particular classes of objects. Each of the different instances of the objects in the image may also be identified, and unique labels be applied to each of the different instances of objects, such as by separately labeling each object in the image with a different identifier.

In one embodiment, instance segmentation masks delineating the various object instances are also be generated. Each instance segmentation mask may be a 2-D image having the same dimensions as the input image, where the value of each pixel may correspond to a label (e.g. a particular instance of the object depicted by the pixel). A different instance segmentation mask may be generated for different images depicting different viewpoints of the objects of interest. For example, a first segmentation mask may be generated to depict object instances in a first image captured by a first camera, and a second segmentation mask may be generated to depict object instances in a second image captured by a second camera. As convolutional neural network such as, for example, Mask R-CNN, may be employed for generating the instance segmentation masks.

At block 404, the object pick estimator 100 engages in identifying object-level correspondences of the objects identified in the instance segmentation masks. In this regard, the object pick estimator 100 may invoke a matching algorithm to identify a segmented instance of a particular object in one image as corresponding (or matching) a segmented instance of the same object in another image. The matching algorithm may be constrained to search for matching object instances along an epipolar line through an object instance in one image captured from a first viewpoint to find a corresponding object instance in a different image captured from a second viewpoint (where the epipolar line is defined in accordance with the extrinsic parameters of the cameras at the first and second viewpoints). In one embodiment, the matching algorithm compares different features of the regions corresponding to the segmented object instances to estimate the object correspondence. The matching of object instances from one image to another may narrow a search space for other image processing tasks such as, for example, evaluating a pickability of the object. The search space may be narrowed to the identified regions of the images that are identified as corresponding to the same object.

At block 406, the object pick estimator 100 generates an output based on the object-level correspondence. The output may be, for example, a pickability score of the object as depicted in the various images from the different viewpoints.

Figure 4B:
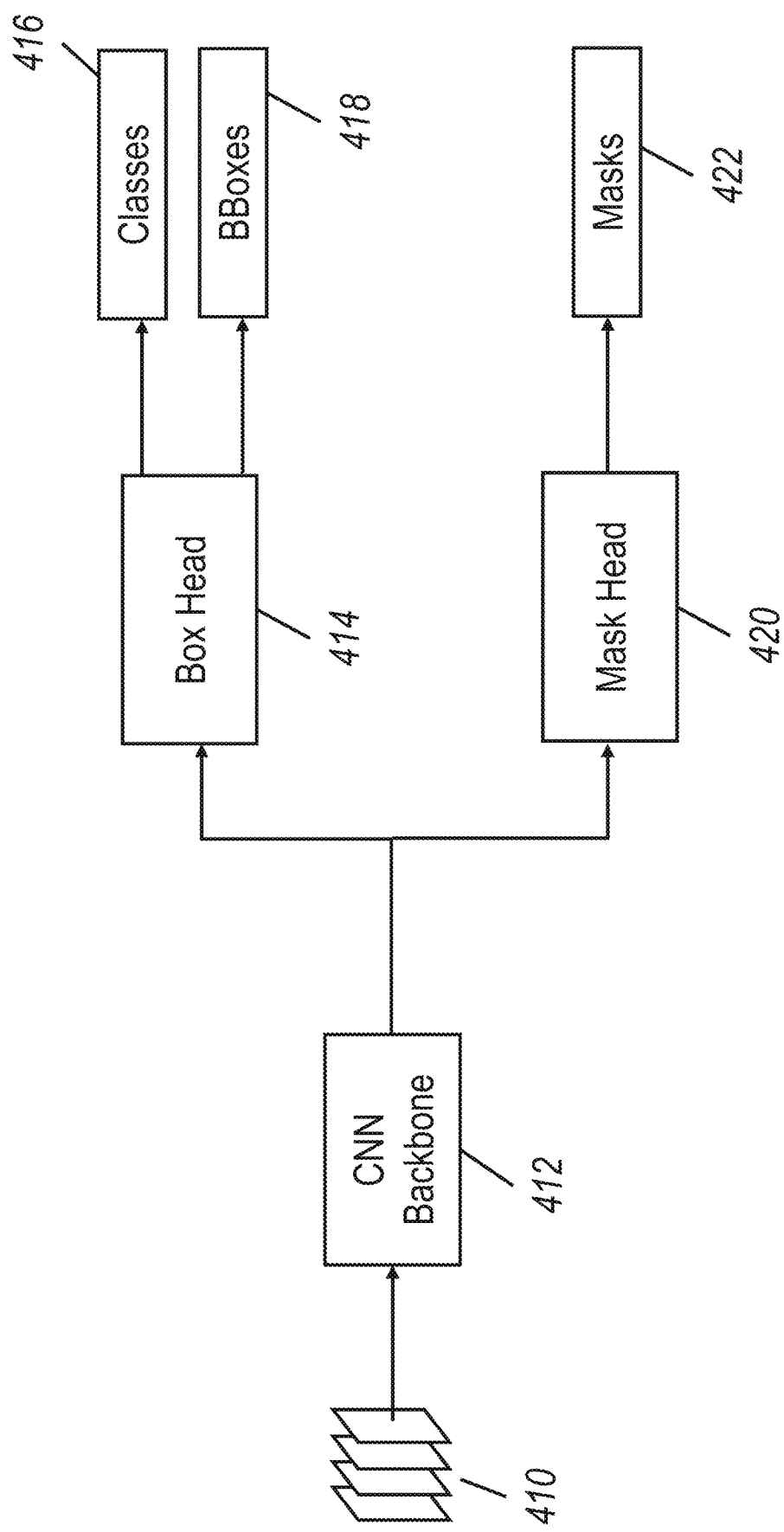
FIG. 4B is a block diagram of an architecture for instance segmentation and mask generation according to one embodiment.

FIG. 4B is a block diagram of an architecture for instance segmentation and mask generation of step 402 according to one embodiment. Input images 410 captured by the various cameras 10, 30 are provided to a deep learning network 412 such as, for example, a CNN backbone. In the embodiments where the images include polarized images, the deep learning network may be implemented as a Polarized CNN backbone as described in PCT Patent Application No. PCT/US2020/048604, also filed as U.S. patent application Ser. No. 17/266,046, the content of which is incorporated herein by reference.

In one embodiment, the deep learning network 412 is configured to generate feature maps based on the input images 410, and employ a region proposal network (RPN) to propose regions of interest from the generated feature maps. The proposals by the CNN backbone may be provided to a box head 414 for performing classification and bounding box regression. In one embodiment, the classification outputs a class label 416 for each of the object instances in the input images 410, and the bounding box regression predicts bounding boxes 418 for the classified objects. In one embodiment, a different class label 416 is provided to each instance of an object.

The proposals by the CNN backbone may also be provided to a mask head 420 for generating instance segmentation masks. The mask head 416 may be implemented as a fully convolutional network (FCN). In one embodiment, the mask head 420 is configured to encode a binary mask for each of the object instances in the input images 410.

Figure 4C:
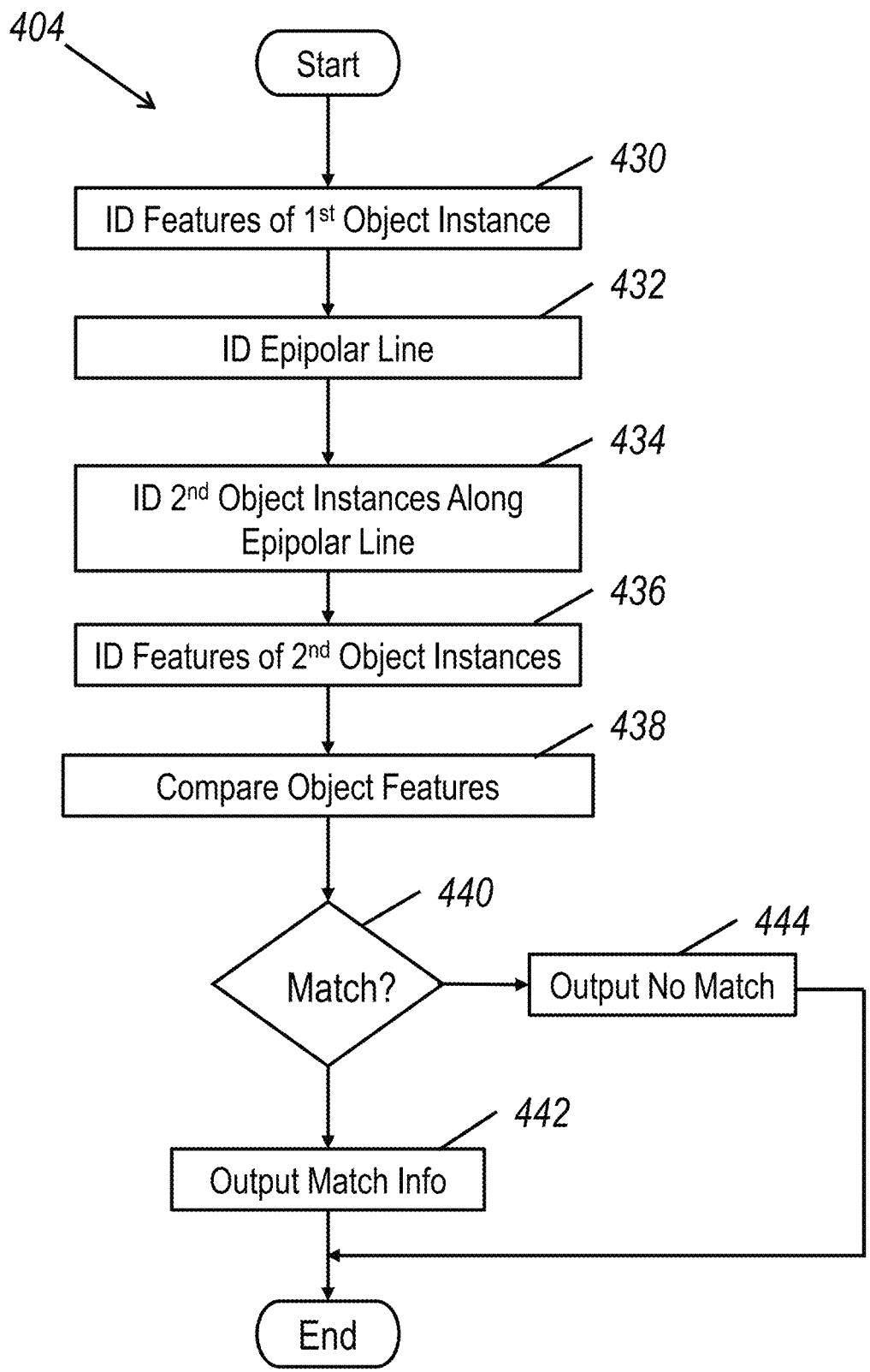
FIG. 4C is a more detailed flow diagram of a matching algorithm for identifying object-level correspondence for a particular object instance in a first segmentation mask according to one embodiment.

FIG. 4C is a more detailed flow diagram of a matching algorithm employed at step 404 (FIG. 4A) for identifying object-level correspondence for a particular object instance in a first segmentation mask according to one embodiment. The process may repeat for all object instances identified in the first segmentation mask. The sequence of steps of the process of FIG. 4C is not fixed, but can be modified, changed in order, performed differently, performed sequentially, concurrently, or simultaneously, or altered into any desired sequence, as recognized by a person of skill in the art.

At block 430, the matching algorithm identifies features of a first object instance in a first segmentation mask. The identified features for the first object instance may include a shape of the region of the object instance, a feature vector in the region, and/or keypoint predictions in the region. The shape of the region for the first object instance may be represented via a set of points sampled along the contours of the region. Where a feature vector in the region is used as the feature descriptor, the feature vector may be an average deep learning feature vector extracted via a convolutional neural network.

At block 432, the matching algorithm identifies an epipolar line through the first object instance in the first segmentation mask.

At block 434, the matching algorithm identifies one or more second object instances in a second segmentation mask that may correspond to the first object instance. A search for the second object instances may be constrained to the epipolar line between the first segmentation mask and the second segmentation mask that runs through the first object instance. In one embodiment, the matching algorithm searches approximately along the identified epiploar line to identify object instances in the second segmentation mask having a same class identifier as the first object instance. For example, if the first object instance belongs to a "dog" class, the matching algorithm evaluates object instances in the second segmentation mask that also belong to the "dog" class, and ignores objects that belong to a different class (e.g., a "cat" class).

At block 436, the matching algorithm identifies the features of the second object instances that belong the same class. As with the first object instance, the features of a particular second object instance may include a shape of the region of the second object instance, a feature vector representing the region, and/or keypoint predictions in the region.

At block 438, the matching algorithm compares the features of the first object instance to the features of second object instances for determining a match. In one embodiment, the matching algorithm identifies a fit between the features of the first object instance and features of the second object instances for selecting a best fit. In one embodiment, the best fit may be identified via a matching function such as the Hungarian matching function. In one embodiment, the features of the object instances are represented as probability distributions, and the matching function attempts to find a match of the probability distributions that minimizes a Kullback-Leibler (KL) divergence.

At block 440, a determination is made as to whether a match has been found. If the answer is YES, an output is generated at block 442. The output may include, for example, information (e.g. object ID) of the second object instance that matched the first object instance.

If the answer is NO, an output may be generate indicating a match failure at block 444.

Accordingly, object level correspondences can be computed from the multi-viewpoint images. These object level correspondences may be used to extract corresponding crops or patches from the multi-viewpoint images, where each of these crops or patches depicts a single instance of an object, and collections of corresponding crops or patches depict the same instance of an object from multiple viewpoints.

Polarized Convolutional Neural Networks

As discussed above, in some embodiments of the present disclosure, the captured images 40 may include polarization raw frames among the images 40 captured by polarization cameras of the imaging system, and the instance segmentation module 110 may include a polarized convolutional neural network (CNN) backbone to segment input images to detect instances of objects including optically challenging objects that might otherwise be difficult to detect in standard intensity images.

Figure 5A:
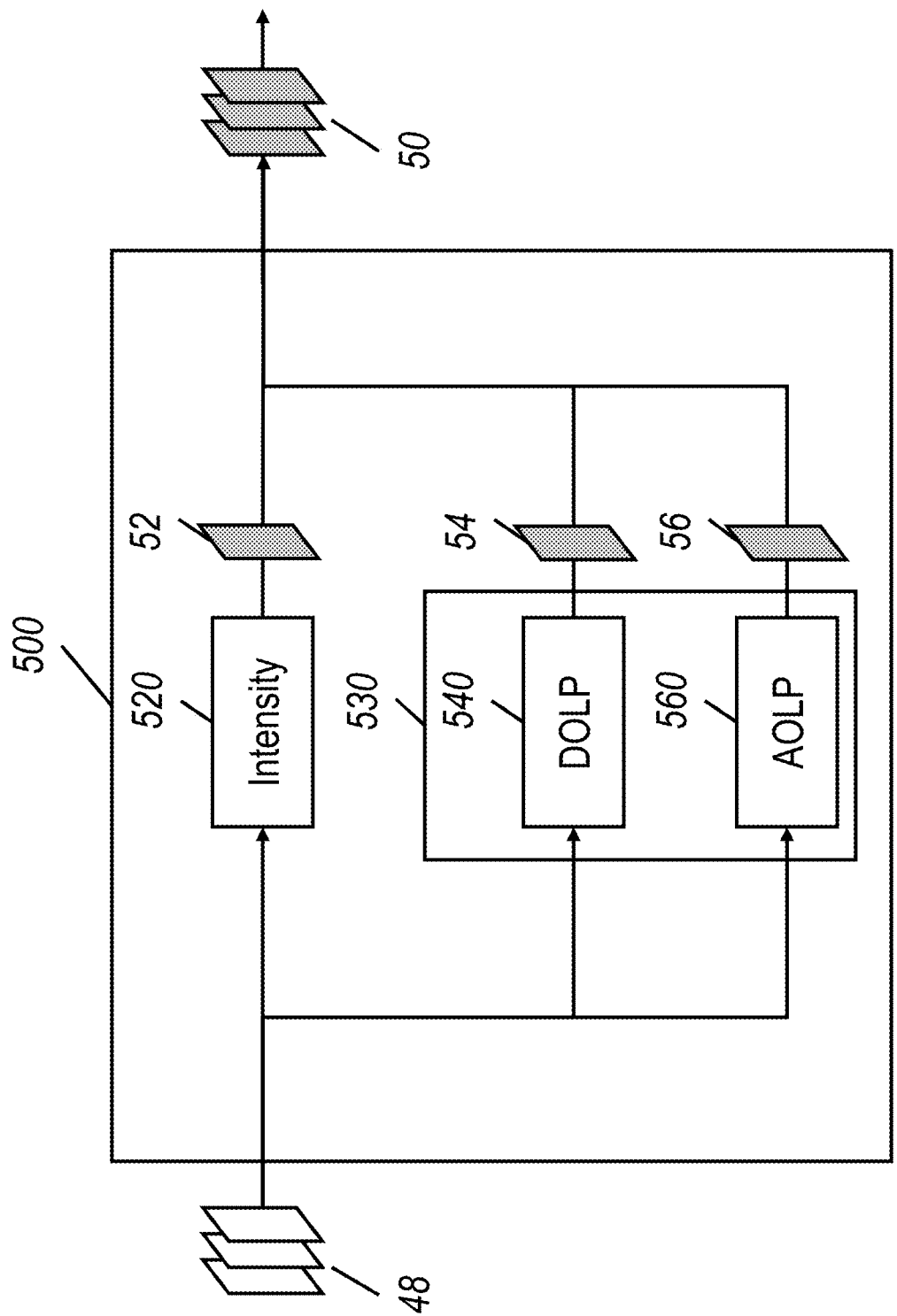
FIG. 5A is a block diagram of a feature extractor according to one embodiment of the present invention.
Figure 5B:
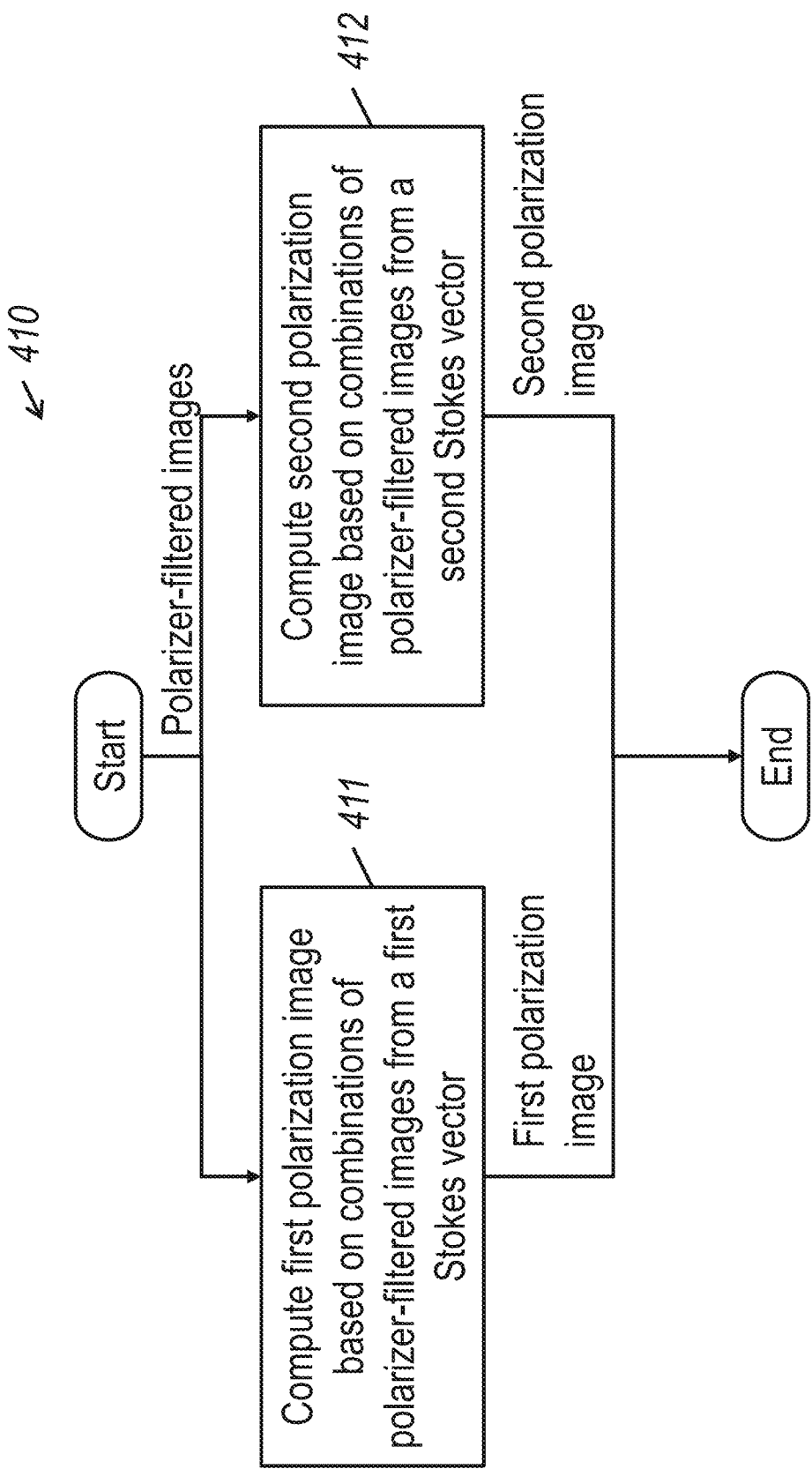
FIG. 5B is a flowchart depicting a method according to one embodiment of the present invention for extracting features from polarization raw frames.

FIG. 5A is a block diagram of a feature extractor 500 according to one embodiment of the present invention. FIG. 5B is a flowchart depicting a method according to one embodiment of the present invention for extracting features from polarization raw frames. In the embodiment shown in FIG. 5A, the feature extractor 500 includes an intensity extractor 520 configured to extract an intensity image I 52 in an intensity representation space (e.g., in accordance with equation (7), as one example of a non-polarization representation space) and polarization feature extractors 530 configured to extract features in one or more polarization representation spaces. As shown in FIG. 5B, the extraction of polarization images in operation 410 may include extracting, in operation 411, a first tensor in a first polarization representation space from the polarization raw frames 48 (among the captured images 40) from a first Stokes vector. In operation 412, the feature extractor 500 further extracts a second tensor in a second polarization representation space from the polarization raw frames 48 (among the captured images 40) from a second Stokes vector. For example, the polarization feature extractors 530 may include a DOLP extractor 540 configured to extract a DOLP ρ image 54 (e.g., a first polarization image or a first tensor in accordance with equation (8) with DOLP as the first polarization representation space) and an AOLP extractor 560 configured to extract an AOLP φ image 56 (e.g., a second polarization image or a second tensor in accordance with equation (9), with AOLP as the second polarization representation space) from the supplied polarization raw frames 48. As another example, the polarization representation spaces may include combinations of polarization raw frames in accordance with Stokes vectors. As further examples, the polarization representations may include modifications or transformations of polarization raw frames in accordance with one or more image processing filters (e.g., a filter to increase image contrast or a denoising filter). The derived feature maps 52, 54, and 56 may then be supplied to a predictor 900 for further processing, such as performing inferences (e.g., generating instance segmentation masks, classifying the images, and generating textual descriptions of the images).

While FIG. 5B illustrates a case where two different tensors are extracted from the polarization raw frames 48 in two different representation spaces, embodiments of the present disclosure are not limited thereto. For example, in some embodiments of the present disclosure, exactly one tensor in a polarization representation space is extracted from the polarization raw frames 48. For example, one polarization representation space of raw frames is AOLP and another is DOLP (e.g., in some applications, AOLP may be sufficient for detecting transparent objects or other optically challenging objects such as translucent, non-Lambertian, multipath inducing, and/or non-reflective objects). In some embodiments of the present disclosure, more than two different tensors are extracted from the polarization raw frames 48 based on corresponding Stokes vectors. For example, as shown in FIG. 5B, n different tensors in n different representation spaces may be extracted by the feature extractor 500, where the n-th tensor is extracted in operation 414.

Accordingly, extracting features such as polarization feature maps or polarization images from polarization raw frames 48 produces first tensors 50 from which transparent objects or other optically challenging objects such as translucent objects, multipath inducing objects, non-Lambertian objects, and non-reflective objects are more easily detected or separated from other objects in a scene. In some embodiments, the first tensors extracted by the feature extractor 500 may be explicitly derived features (e.g., hand crafted by a human designer) that relate to underlying physical phenomena that may be exhibited in the polarization raw frames (e.g., the calculation of AOLP and DOLP images, as discussed above). In some additional embodiments of the present disclosure, the feature extractor 500 extracts other non-polarization feature maps or non-polarization images, such as intensity maps for different colors of light (e.g., red, green, and blue light) and transformations of the intensity maps (e.g., applying image processing filters to the intensity maps). In some embodiments of the present disclosure the feature extractor 500 may be configured to extract one or more features that are automatically learned (e.g., features that are not manually specified by a human) through an end-to-end supervised training process based on labeled training data.

Computing Predictions Such as Segmentation Masks Based on Polarization Features Computed from Polarization Raw Frames As noted above, some aspects of embodiments of the present disclosure relate to providing first tensors in polarization representation space such as polarization images or polarization feature maps, such as the DOLP ρ and AOLP ϕ images extracted by the feature extractor 500, to a predictor such as a semantic segmentation algorithm to perform multi-modal fusion of the polarization images to generate learned features (or second tensors) and to compute predictions such as instance segmentation masks based on the learned features or second tensors. Specific embodiments relating to semantic segmentation or instance segmentation will be described in more detail below.

Generally, there are many approaches to semantic segmentation, including deep instance techniques. The various the deep instance techniques bay be classified as semantic segmentation-based techniques (such as those described in: Min Bai and Raquel Urtasun. Deep watershed transform for instance segmentation. In *Proceedings of the IEEE Conference on Computer Vision and Pattern Recognition*, pages 5221-5229, 2017; Alexander Kirillov, Evgeny Levinkov, Bjoern Andres, Bogdan Savchynskyy, and Carsten Rother. Instancecut: from edges to instances with multicut. In *Proceedings of the IEEE Conference on Computer Vision and Pattern Recognition*, pages 5008-5017, 2017; and Anurag Arnab and Philip HS Torr. Pixelwise instance segmentation with a dynamically instantiated network. In *Proceedings of the IEEE Conference on Computer Vision and Pattern Recognition*, pages 441-450, 2017.), proposal-based techniques (such as those described in: Kaiming He, Georgia Gkioxari, Piotr Doll'ar, and Ross Girshick. Mask r-cnn. In *Proceedings of the IEEE International Conference on Computer Vision*, pages 2961-2969, 2017.) and recurrent neural network (RNN) based techniques (such as those described in: Bernardino Romera-Paredes and Philip Hilaire Sean Torr. Recurrent instance segmentation. In *European Conference on Computer Vision*, pages 312-329. Springer, 2016 and Mengye Ren and Richard S Zemel. End-to-end instance segmentation with recurrent attention. In *Proceedings of the IEEE Conference on Computer Vision and Pattern Recognition*, pages 6656-6664, 2017.). Embodiments of the present disclosure may be applied to any of these semantic segmentation techniques.

While some comparative approaches supply concatenated polarization raw frames (e.g., images $I_0$, $I_{45}$, $I_{90}$, and $I_{135}$ as described above) directly into a deep network without extracting first tensors such as polarization images or polarization feature maps therefrom, models trained directly on these polarization raw frames as inputs generally struggle to learn the physical priors, which leads to poor performance, such as failing to detect instances of transparent objects or other optically challenging objects. Accordingly, aspects of embodiments of the present disclosure relate to the use of polarization images or polarization feature maps (in some embodiments in combination with other feature maps such as intensity feature maps) to perform instance segmentation on images of transparent objects in a scene.

One embodiment of the present disclosure using deep instance segmentation is based on a modification of a Mask Region-based Convolutional Neural Network (Mask R-CNN) architecture to form a Polarized Mask R-CNN architecture. Mask R-CNN works by taking an input image x, which is an H×W×3 tensor of image intensity values (e.g., height by width by color intensity in red, green, and blue channels), and running it through a backbone network: C=B(x). The backbone network B(x) is responsible for extracting useful learned features from the input image and can be any standard CNN architecture such as AlexNet (see, e.g., Krizhevsky, Alex, Ilya Sutskever, and Geoffrey E. Hinton. "ImageNet classification with deep convolutional neural networks." *Advances in neural information processing systems*. 2012.), VGG (see, e.g., Simonyan, Karen, and Andrew Zisserman. "Very deep convolutional networks for large-scale image recognition." *arXiv preprint arXiv:1409.1556* (2014).), ResNet-101 (see, e.g., Kaiming He, Xiangyu Zhang, Shaoqing Ren, and Jian Sun. Deep residual learning for image recognition. In *Proceedings of the IEEE Conference on Computer Vision and Pattern Recognition*, pages 770-778, 2016.), MobileNet (see, e.g., Howard, Andrew G., et al. "Mobilenets: Efficient convolutional neural networks for mobile vision applications." *arXiv preprint arXiv:1704.04861* (2017).), MobileNetV2 (see, e.g., Sandler, Mark, et al. "MobileNetV2: Inverted residuals and linear bottlenecks." *Proceedings of the IEEE Conference on Computer Vision and Pattern Recognition*. 2018.), and MobileNetV3 (see, e.g., Howard, Andrew, et al. "Searching for MobileNetV3." *Proceedings of the IEEE International Conference on Computer Vision*. 2019.)

The backbone network B (x) outputs a set of tensors, e.g., C={$C_1$, $C_2$, $C_3$, $C_4$, $C_5$}, where each tensor $C_i$ represents a different resolution feature map. These feature maps are then combined in a feature pyramid network (FPN) (see, e.g., Tsung-Yi Lin, Piotr Doll'ar, Ross Girshick, Kaiming He, Bharath Hariharan, and Serge Belongie. Feature pyramid networks for object detection. In *Proceedings of the IEEE Conference on Computer Vision and Pattern Recognition*, pages 2117-2125, 2017.), processed with a region proposal network (RPN) (see, e.g., Shaoqing Ren, Kaiming He, Ross Girshick, and Jian Sun. Faster r-cnn: Towards real-time object detection with region proposal networks. *In Advances in Neural Information Processing Systems*, pages 91-99, 2015.), and finally passed through an output subnetwork (see, e.g., Ren et al. and He et al., above) to produce classes, bounding boxes, and pixel-wise segmentations. These are merged with non-maximum suppression for instance segmentation.

Aspects of embodiments of the present invention relate to a framework for leveraging the additional information contained in polarized images using deep learning, where this additional information is not present in input images captured by comparative cameras (e.g., information not captured standard color or monochrome cameras without the use of polarizers or polarizing filters). Neural network architectures constructed in accordance with frameworks of embodiments of the present disclosure will be referred to herein as Polarized Convolutional Neural Networks (CNNs).

Applying this framework according to some embodiments of the present disclosure involves three changes to a CNN architecture:

(1) Input Image: Applying the physical equations of polarization to create the input polarization images to the CNN, such as by using a feature extractor 500 according to some embodiments of the present disclosure.

(2) Attention-fusion Polar Backbone: Treating the problem as a multi-modal fusion problem by fusing the learned features computed from the polarization images by a trained CNN backbone.

(3) Geometric Data Augmentations: augmenting the training data to represent the physics of polarization.

However, embodiments of the present disclosure are not limited thereto. Instead, any subset of the above three changes and/or changes other than the above three changes may be made to an existing CNN architecture to create a Polarized CNN architecture within embodiments of the present disclosure.

A Polarized CNN according to some embodiments of the present disclosure may be implemented using one or more electronic circuits configured to perform the operations described in more detail below. In the embodiment shown in FIG. 3A, a Polarized CNN is used as a component of the instance segmentation module 110 for computing an instance segmentation mask.

Figure 6:
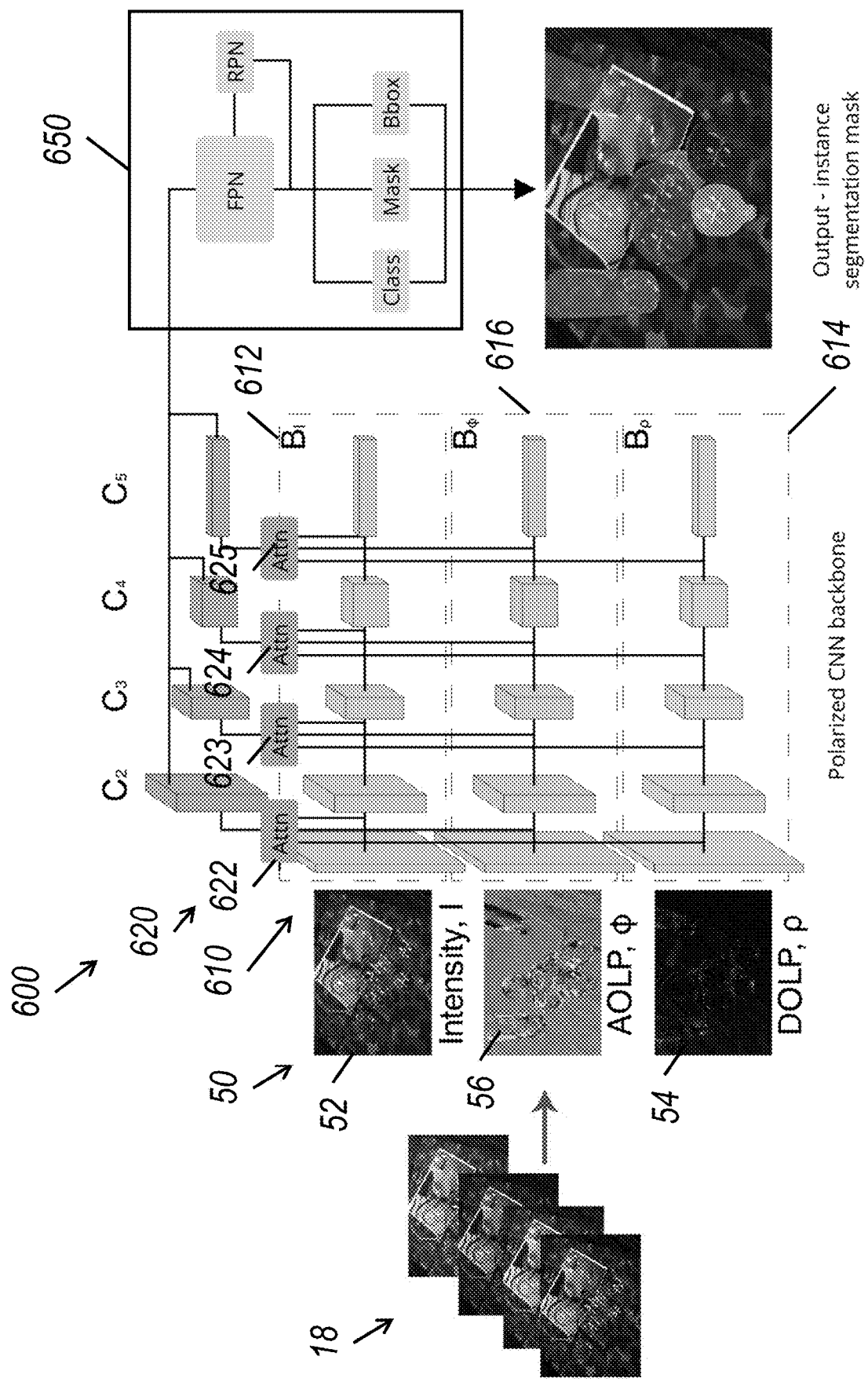
FIG. 6 is a block diagram depicting a Polarized CNN architecture according to one embodiment of the present invention as applied to a Mask-Region-based convolutional neural network (Mask R-CNN) backbone.

FIG. 6 is a block diagram depicting a Polarized CNN architecture according to one embodiment of the present invention as applied to a Mask-Region-based convolutional neural network (Mask R-CNN) backbone, where second tensors C (or output tensors such as learned feature maps) are used to compute an output prediction such as an instance segmentation mask.

While some embodiments of the present disclosure relate to a semantic segmentation or instance segmentation using a Polarized CNN architecture as applied to a Mask R-CNN backbone, embodiments of the present disclosure are not limited thereto, and other backbones such as AlexNet, VGG, MobileNet, MobileNetV2, MobileNetV3, and the like may be modified in a similar manner.

In the embodiment shown in FIG. 6, derived feature maps 50 (e.g., including input polarization images such as AOLP ϕ and DOLP ρ images) are supplied as inputs to a Polarized CNN backbone 610. In the embodiment shown in FIG. 6, the input feature maps 50 include three input images: the intensity image (I) 52, the AOLP (ϕ) 56, the DOLP (ρ) 54 from equation (1) as the input for detecting a transparent object and/or other optically challenging object. These images are computed from polarization raw frames 48 (e.g., images $I_0$, $I_{45}$, $I_{90}$, and $I_{135}$ as described above), normalized to be in a range (e.g., 8-bit values in the range [0-255]) and transformed into three-channel gray scale images to allow for easy transfer learning based on networks pre-trained on the MSCoCo dataset (see, e.g., Tsung-Yi Lin, Michael Maire, Serge Belongie, James Hays, Pietro Perona, Deva Ramanan, Piotr Doll'ar, and C Lawrence Zitnick. Microsoft coco: Common objects in context. In European Conference on Computer Vision, pages 740-755. Springer, 2014.).

In the embodiment shown in FIG. 6, each of the input derived feature maps 50 is supplied to a separate backbone: intensity $B_I(I)$ 612, AOLP backbone $B_\phi(\phi)$ 614, and DOLP backbone $B_\rho(\rho)$ 616. The CNN backbones 612, 614, and 616 compute tensors for each mode, or "mode tensors" (e.g., feature maps computed based on parameters learned during training or transfer learning of the CNN backbone, discussed in more detail below) $C_{i,I}$, $C_{i,\rho}$, $C_{i,\phi}$ at different scales or resolutions i. While FIG. 6 illustrates an embodiment with five different scales i, embodiments of the present disclosure are not limited thereto and may also be applied to CNN backbones with different numbers of scales.

Some aspects of embodiments of the present disclosure relate to a spatially-aware attention-fusion mechanism to perform multi-modal fusion (e.g., fusion of the feature maps computed from each of the different modes or different types of input feature maps, such as the intensity feature map I, the AOLP feature map ϕ, and the DOLP feature map ρ).

For example, in the embodiment shown in FIG. 6, the mode tensors $C_{i,I}$, $C_{i,\rho}$, $C_{i,\phi}$ (tensors for each mode) computed from corresponding backbones $B_I$, $B_\rho$, $B_\phi$ at each scale i are fused using fusion layers 622, 623, 624, 625 (collectively, fusion layers 620) for corresponding scales. For example, fusion layer 622 is configured to fuse mode tensors $C_{2,I}$, $C_{2,\rho}$, $C_{2,\phi}$ computed at scale i=2 to compute a fused tensor $C_2$. Likewise, fusion layer 623 is configured to fuse mode tensors $C_{3,I}$, $C_{3,\rho}$, $C_{3,\phi}$ computed at scale i=3 to compute a fused tensor $C_3$, and similar computations may be performed by fusion layers 624 and 625 to compute fused feature maps $C_4$ and $C_5$, respectively, based on respective mode tensors for their scales. The fused tensors $C_i$ (e.g., $C_2$, $C_3$, $C_4$, $C_5$), or second tensors, such as fused feature maps, computed by the fusion layers 620 are then supplied as input to a prediction module 650, which is configured to compute a prediction from the fused tensors, where the prediction may be an output such as an instance segmentation mask, a classification, a textual description, or the like.

Figure 7:
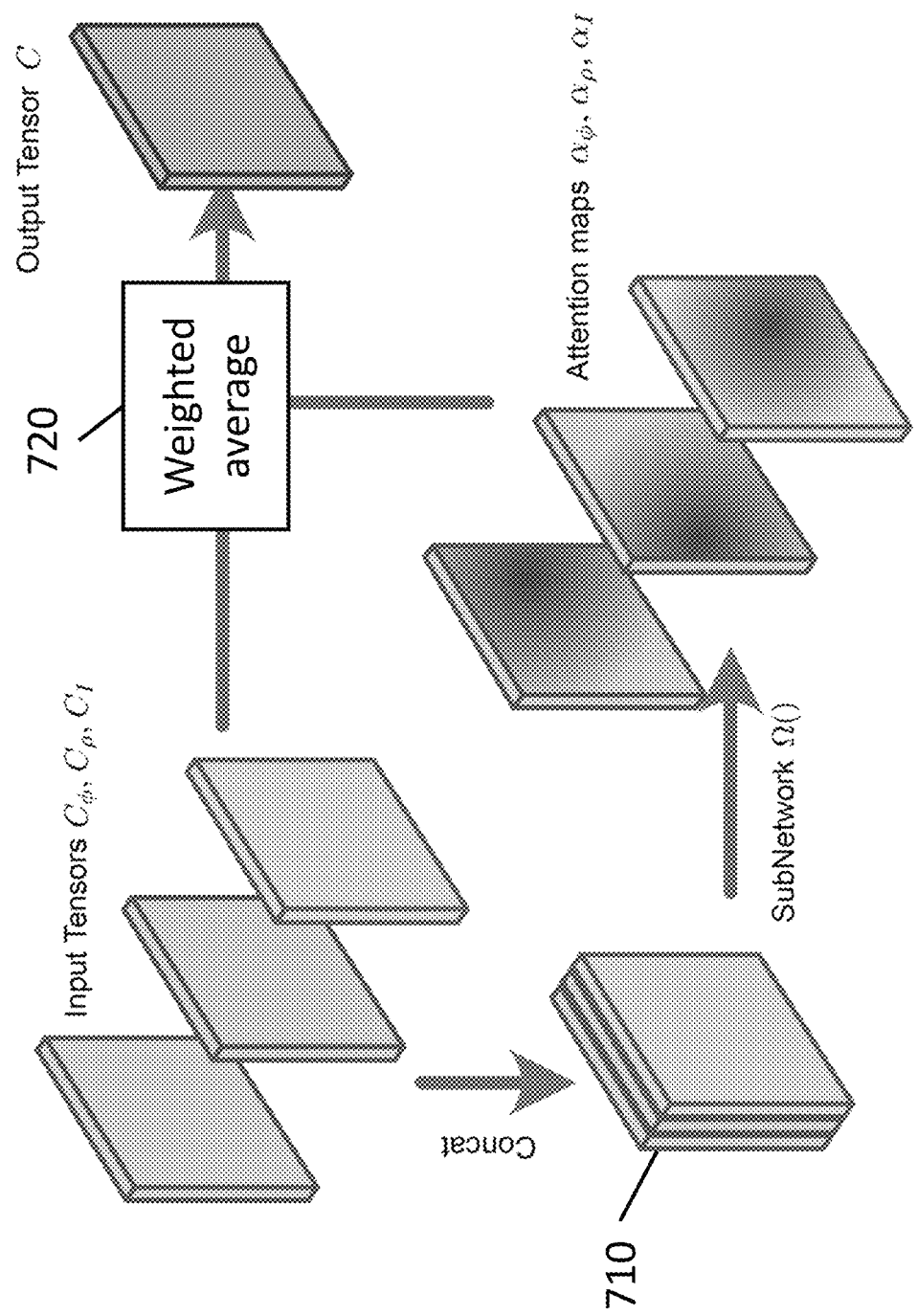
FIG. 7 is a block diagram of an attention module that may be used with a polarized CNN according to one embodiment of the present invention.

FIG. 7 is a block diagram of an i-th fusion layer among the fusion layers 620 that may be used with a Polarized CNN according to one embodiment of the present invention. As shown in FIG. 7, in some embodiments of the present disclosure, a fusion layer (e.g., each of the fusion layer 620) is implemented using an attention module, in which the predictor 600 concatenates the supplied input tensors or input feature maps $C_{i,I}$, $C_{i,\rho}$, $C_{i,\phi}$ computed by the CNN backbones for the i-th scale and to generate concatenated tensor 710, where the concatenated tensor 710 is processed through a set of trained convolutional layers or attention subnetwork $\Omega_i$ for the i-th. scale. The attention subnetwork outputs a 3-channel image with the same height and width as the input tensors, and, in some embodiments, a softmax function is applied to each pixel of the 3-channel image to compute pixel-wise attention weights a for the i-th scale:

$$[\alpha_{i,\phi}, \alpha_{i,\rho}, \alpha_{i,I}] = \text{softmax}(\Omega_i([C_{i,\phi}, C_{i,\rho}, C_{i,I}])) \quad (15)$$

These attention weights are used to perform a weighted average 720 per channel:

$$C_i = \alpha_{i,\phi} C_{i,\phi} + \alpha_{i,\rho} C_{i,\rho} + \alpha_{i,I} C_{i,I} \quad (16)$$

Accordingly, using an attention module allows a Polarized CNN according to some embodiments of the present disclosure to weight the different inputs at the scale i (e.g., the intensity I tensor or learned feature map $C_{i,I}$, the DOLP tensor or learned feature map $C_{i,\rho}$, and the AOLP tensor or learned feature map $C_{i,\phi}$ at scale i) based on how relevant they are to a given portion of the scene, where the relevance is determined by the trained attention subnetwork $\Omega_i$ in accordance with the labeled training data used to train the Polarized CNN backbone.

Accordingly, aspects of embodiments of the present disclosure relate to systems and methods for computing object picking plans for an object in a scene without explicitly computing of a six-degree of freedom pose of the object and/or other objects in the scene. In some circumstances, it is infeasible for a robotic vision system to estimate the pose of an object within the accuracy required by a robotic controller to perform an object pick. For example, pose estimation may be made difficult or impossible due to the deformation of the object, a small object size, and environmental constraints.

In addition, the computation of instance segmentation masks and depth maps in various embodiments of the present disclosure is relatively simple, faster, and less prone to error than some comparative pose estimation pipelines which perform pose refinement and other steps in addition to computing instance segmentation masks and depth maps. These additional steps performed by pose estimation pipelines may increase the processing time and costs, which may also make pose estimation infeasible in circumstances where short cycle times may make it difficult to compute an accurate pose within the time allotted. In circumstances where a pose estimation pipeline trades away accuracy in favor of speed, errors in the estimated object pose can drastically change the pickability analysis of the objects and may cause a robot to attempt to pick a more difficult object or worse make the robot attempt an entirely incorrect approach when trying to pick up the object.

In contrast, embodiments of the present disclosure are able to compute object picking plans based solely on instance segmentation masks and, in some embodiments instance segmentation masks in combination with depth maps. As such, the processing pipeline is shorter than pose estimation pipelines, and the avoided the extra computation time for computing the poses of objects in the scene results in lower latency computations.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for controlling a robotic system, the method comprising:
    capturing, by an imaging system, one or more images of a scene;
    computing, by a processing circuit comprising a processor and memory, one or more instance segmentation masks based on the one or more images, the one or more instance segmentation masks detecting one or more objects in the scene;
    computing one or more depth maps based on the one or more images of the scene;
    segmenting the one or more depth maps into one or more point clouds using the one or more instance segmentation masks, the one or more point clouds corresponding to the one or more objects in the scene;
    computing, by the processing circuit, one or more pickability scores for the one or more objects, wherein the computing the one or more pickability scores for the one or more objects comprises computing a pickability score for an object of the one or more objects by:
        computing a measure of clutter in a neighborhood of the object based on the one or more point clouds;
        computing a measure of distance of the object from a current location of the end effector of the robotic arm based on the one or more point clouds, and
        computing a measure of how much an object protrudes from other objects of the one or more objects based on the one or more point clouds;
    selecting, by the processing circuit, an object among the one or more objects based on the one or more pickability scores;
    computing, by the processing circuit, an object picking plan for the selected object; and
    outputting, by the processing circuit, the object picking plan to a controller configured to control an end effector of a robotic arm to pick the selected object.

2. The method of claim 1, wherein the object picking plan comprises a picking position and a direction of approach,
    wherein the computing the object picking plan for the selected object comprises computing the picking position based on a visible center of mass of a point cloud corresponding to the selected object.

3. The method of claim 2, wherein the computing the picking position further comprises computing an estimated center of mass based on adjusting the visible center of mass by a scalar value to be farther from a viewpoint corresponding to a camera used to capture the one or more images of the scene.

4. The method of claim 1, wherein the computing the one or more pickability scores for the one or more objects comprises supplying the one or more depth maps and the one or more instance segmentation masks to an object pickability neural network.

5. The method of claim 1, wherein the computing the one or more pickability scores for the one or more objects comprises computing a pickability score for an object of the one or more objects by:
    computing a measure of clutter in a neighborhood of the object based on the one or more instance segmentation masks;
    computing a measure of distance of the object from a current location of the end effector of the robotic arm based on the one or more instance segmentation masks; and
    computing a measure of how much an object protrudes from other objects of the one or more objects based on the one or more instance segmentation masks.

6. The method of claim 5, wherein the computing the one or more pickability scores for the one or more objects comprising supplying the one or more instance segmentation masks to an object pickability neural network.

7. The method of claim 1, wherein the object picking plan comprises a picking position and a direction of approach.

8. The method of claim 1, wherein the one or more images comprise polarization one or more respective raw frames.

9. The method of claim 1, wherein the one or more instance segmentation masks are computed using a trained convolutional neural network.

10. The method of claim 1, further comprising computing instance segmentation masks from images captured from a plurality of different viewpoints.

11. The method of claim 10, wherein the pickability scores for the one or more objects are computed independently for different viewpoints, and
    wherein the selecting the object is based on the one or more pickability scores of the object aggregated across different viewpoints.

12. The method of claim 11, further comprising computing depth maps for the different viewpoints, and
    wherein the pickability scores are further computed based on the depth maps.

13. A system comprising:
a processor; and
memory storing instructions that, when executed by the processor, cause the processor to:
receive one or more images of a scene from an imaging system;
compute one or more instance segmentation masks based on the one or more images, the one or more instance segmentation masks detecting one or more objects in the scene;
compute one or more depth maps based on the one or more images of the scene;
segment the one or more depth maps into one or more point clouds using the one or more instance segmentation masks, the one or more point clouds corresponding to the one or more objects in the scene;
compute one or more pickability scores for the one or more objects, wherein the instructions to compute the one or more pickability scores for the one or more objects further comprise instructions that, when executed by the processor, cause the processor to compute a pickability score for an object of the one or more objects by:
computing a measure of clutter in a neighborhood of the object based on the one or more point clouds,
computing a measure of distance of the object from a current location of the end effector of the robotic arm based on the one or more point clouds, and
computing a measure of how much an object protrudes from other objects of the one or more objects based on the one or more point clouds;
select an object among the one or more objects based on the one or more pickability scores;
compute an object picking plan for the selected object; and
output the object picking plan to a controller configured to control an end effector of a robotic arm to pick the selected object.

14. The system of claim 13, wherein the object picking plan comprises a picking position and a direction of approach,
wherein the instructions to compute the object picking plan for the selected object further comprise instructions that, when executed by the processor, cause the processor to compute the picking position based on a visible center of mass of a point cloud corresponding to the selected object.

15. The system of claim 14, wherein the instructions to compute the picking position further comprise instructions that, when executed by the processor, cause the processor to compute an estimated center of mass based on adjusting the visible center of mass by a scalar value to be farther from a viewpoint corresponding to a camera used to capture the one or more images of the scene.

16. The system of claim 13, wherein the instructions to compute the one or more pickability scores for the one or more objects further comprise instructions that, when executed by the processor, cause the processor to supply the one or more depth maps and the one or more instance segmentation masks to an object pickability neural network.

17. The system of claim 13, wherein the instructions to compute the one or more pickability scores for the one or more objects comprise instructions that, when executed by the processor, cause the processor to compute a pickability score for an object of the one or more objects by:

computing a measure of clutter in a neighborhood of the object based on the one or more instance segmentation masks;
computing a measure of distance of the object from a current location of the end effector of the robotic arm based on the one or more instance segmentation masks; and
computing a measure of how much an object protrudes from other objects of the one or more objects based on the one or more instance segmentation masks.

18. The system of claim 17, wherein the instructions to compute the one or more pickability scores for the one or more objects further comprise instructions that, when executed by the processor, cause the processor to supply the one or more instance segmentation masks to an object pickability neural network.

19. The system of claim 13, wherein the object picking plan comprises a picking position and a direction of approach.

20. The system of claim 13, wherein the one or more images comprise one or more respective polarization raw frames.

21. The system of claim 13, wherein the one or more instance segmentation masks are computed using a trained convolutional neural network.

22. The system of claim 13, wherein the memory further stores instructions that, when executed by the processor, cause the processor to compute instance segmentation masks from images captured from a plurality of different viewpoints.

23. The system of claim 22, wherein the pickability scores for the one or more objects are computed independently for different viewpoints, and
wherein the memory further stores instructions that, when executed by the processor, cause the processor to select the object based on the one or more pickability scores of the object aggregated across different viewpoints.

24. The system of claim 22, wherein the memory further stores instructions that, when executed by the processor, cause the processor to compute depth maps for the different viewpoints, and
wherein the pickability scores are further computed based on the depth maps.

25. A method for controlling a robotic system, the method comprising:
capturing, by an imaging system, one or more images of a scene;
computing, by a processing circuit comprising a processor and memory, one or more instance segmentation masks based on the one or more images, the one or more instance segmentation masks detecting one or more objects in the scene;
computing one or more depth maps based on the one or more images of the scene;
segmenting the one or more depth maps into one or more point clouds using the one or more instance segmentation masks, the one or more point clouds corresponding to the one or more objects in the scene;
computing, by the processing circuit, one or more pickability scores for the one or more objects;
selecting, by the processing circuit, an object among the one or more objects based on the one or more pickability scores;
computing, by the processing circuit, an object picking plan for the selected object,
wherein the object picking plan comprises a picking position and a direction of approach, wherein the computing the object picking plan for the selected object comprises computing the picking position based on a visible center of mass of a point cloud corresponding to the selected object; and outputting, by the processing circuit, the object picking plan to a controller configured to control an end effector of a robotic arm to pick the selected object.

26. A method for controlling a robotic system, the method comprising:

capturing, by an imaging system, one or more images of a scene;

computing, by a processing circuit comprising a processor and memory, one or more instance segmentation masks based on the one or more images, the one or more instance segmentation masks detecting one or more objects in the scene;

computing, by the processing circuit, one or more pickability scores for the one or more objects, wherein the computing the one or more pickability scores for the one or more objects comprises computing a pickability score for an object of the one or more objects by:

computing a measure of clutter in a neighborhood of the object based on the one or more instance segmentation masks, computing a measure of distance of the object from a current location of the end effector of the robotic arm based on the one or more instance segmentation masks, and computing a measure of how much an object protrudes from other objects of the one or more objects based on the one or more instance segmentation masks;

selecting, by the processing circuit, an object among the one or more objects based on the one or more pickability scores;

computing, by the processing circuit, an object picking plan for the selected object; and outputting, by the processing circuit, the object picking plan to a controller configured to control an end effector of a robotic arm to pick the selected object.

27. A method for controlling a robotic system, the method comprising:

capturing, by an imaging system, one or more images of a scene from a plurality of different viewpoints;

computing, by a processing circuit comprising a processor and memory, one or more instance segmentation masks based on the one or more images, the one or more instance segmentation masks detecting one or more objects in the scene;

computing, by the processing circuit, one or more pickability scores for the one or more objects, wherein the pickability scores for the one or more objects are computed independently for different viewpoints;

selecting, by the processing circuit, an object among the one or more objects based on the one or more pickability scores of the object aggregated across different viewpoints;

computing, by the processing circuit, an object picking plan for the selected object; and outputting, by the processing circuit, the object picking plan to a controller configured to control an end effector of a robotic arm to pick the selected object.

28. A system comprising:

a processor; and memory storing instructions that, when executed by the processor, cause the processor to:

receive one or more images of a scene from an imaging system;

compute one or more instance segmentation masks based on the one or more images, the one or more instance segmentation masks detecting one or more objects in the scene;

compute one or more depth maps based on the one or more images of the scene;

segment the one or more depth maps into one or more point clouds using the one or more instance segmentation masks, the one or more point clouds corresponding to the one or more objects in the scene;

compute one or more pickability scores for the one or more objects;

select an object among the one or more objects based on the one or more pickability scores;

compute an object picking plan for the selected object, wherein the object picking plan comprises a picking position and a direction of approach, wherein the instructions to compute the object picking plan for the selected object further comprise instructions that, when executed by the processor, cause the processor to compute the picking position based on a visible center of mass of a point cloud corresponding to the selected object; and output the object picking plan to a controller configured to control an end effector of a robotic arm to pick the selected object.

29. A system comprising:

a processor; and memory storing instructions that, when executed by the processor, cause the processor to:

receive one or more images of a scene from an imaging system;

compute one or more instance segmentation masks based on the one or more images, the one or more instance segmentation masks detecting one or more objects in the scene;

compute one or more pickability scores for the one or more objects, wherein the instructions to compute the one or more pickability scores for the one or more objects comprise instructions that, when executed by the processor, cause the processor to compute a pickability score for an object of the one or more objects by:

computing a measure of clutter in a neighborhood of the object based on the one or more instance segmentation masks, computing a measure of distance of the object from a current location of the end effector of the robotic arm based on the one or more instance segmentation masks, and computing a measure of how much an object protrudes from other objects of the one or more objects based on the one or more instance segmentation masks;

select an object among the one or more objects based on the one or more pickability scores;

compute an object picking plan for the selected object; and output the object picking plan to a controller configured to control an end effector of a robotic arm to pick the selected object.

30. A system comprising:

a processor; and memory storing instructions that, when executed by the processor, cause the processor to:

receive one or more images of a scene from a plurality of different viewpoints, from an imaging system;

compute one or more instance segmentation masks based on the one or more images, the one or more instance segmentation masks detecting one or more objects in the scene;

compute one or more pickability scores for the one or more objects, wherein the pickability scores for the one or more objects are computed independently for different viewpoints;

select an object among the one or more objects based on the one or more pickability scores of the object aggregated across different viewpoints;

compute an object picking plan for the selected object; and output the object picking plan to a controller configured to control an end effector of a robotic arm to pick the selected object.

\* \* \* \* \*